United States Patent [19]
Williams et al.

[11] Patent Number: 5,664,985
[45] Date of Patent: Sep. 9, 1997

[54] METHOD AND APPARATUS FOR TEXTURIZING DISKS

[75] Inventors: Roger O. Williams, Fremont; Ira B. Cushing, Sebastopol; Stephen J. Jurovich, Tracy; Curt M. Jacobs, Redwood Shores, all of Calif.; Robert A. Smith, Champaign, Ill.

[73] Assignee: Exclusive Design Company, Inc., Fremont, Calif.

[21] Appl. No.: 397,621

[22] Filed: Mar. 2, 1995

[51] Int. Cl.$^6$ .................... B24B 49/02; B24B 51/00; G06F 7/38
[52] U.S. Cl. .................... 451/5; 451/9; 451/10; 451/14; 451/63; 451/302; 451/306; 451/394; 340/680; 364/716.01
[58] Field of Search .................... 451/5, 9, 10, 14, 451/42, 63, 254, 290, 302, 305, 306, 366, 394; 340/680; 364/716

[56] References Cited

U.S. PATENT DOCUMENTS

| | | | |
|---|---|---|---|
| 4,347,689 | 9/1982 | Hammond | 451/63 |
| 4,796,201 | 1/1989 | Wake . | |
| 4,964,242 | 10/1990 | Ruble et al. | 451/306 |
| 4,973,496 | 11/1990 | Kruger et al. . | |
| 4,982,343 | 1/1991 | Hourvitz et al. . | |
| 4,984,181 | 1/1991 | Kliman et al. . | |
| 5,016,183 | 5/1991 | Shyong . | |
| 5,088,240 | 2/1992 | Ruble et al. | 451/63 |
| 5,099,615 | 3/1992 | Ruble et al. | 451/63 X |
| 5,167,096 | 12/1992 | Eltoukhy et al. | 451/63 X |
| 5,193,314 | 3/1993 | Wormley et al. | 451/5 |
| 5,255,360 | 10/1993 | Peaslee et al. . | |
| 5,307,593 | 5/1994 | Lucker et al. | 451/63 |
| 5,327,509 | 7/1994 | Rich . | |
| 5,482,497 | 1/1996 | Gonnella et al. | 451/37 X |
| 5,486,134 | 1/1996 | Jones et al. | 451/63 X |
| 5,490,809 | 2/1996 | Jones et al. . | |

*Primary Examiner*—Timothy V. Eley
*Attorney, Agent, or Firm*—Pennie & Edmonds LLP

[57] ABSTRACT

A method and apparatus is disclosed for texturizing magnetic storage disks. The disk texturizing apparatus utilizes a combination of servomotors for rotating the disk and oscillating the disk towards and away from a texturizing media. The servomotors are controlled by a closed-loop control system which monitors and synchronizes the angular and linear position of the disk. Through such control, the disk rotation speed may be modulated in conjunction with the linear oscillation, thereby allowing a higher degree of triangularity in the texturization pattern. A pattern generation system and a graphical user interface for specifying, modeling, generating, modifying and displaying disk texturizing patterns are also disclosed. The texturizing pattern may be displayed in polar plot and linear plot form so that the user can more easily visualize and design the texturizing pattern. Warning signals are used when the texturizing pattern exceeds the acceleration or amplitude limitations of the physical texturizing apparatus, or when the designed pattern repeats. The pattern generation system may also be used to generate a data sequence describing a particular pattern which is exportable to the physical disk texturizing apparatus.

71 Claims, 19 Drawing Sheets

METHOD AND APPARATUS FOR TEXTURIZING DISKS

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

1. Technical Field

The present invention relates to texturizing and polishing disks. Specifically, the present invention relates to a method and apparatus for texturizing disks of the type used for magnetic storage of information.

2. Discussion of the Related Art

During operation, magnetic storage disks spin at high speeds while a read/write head floats on a cushion of air near the surface of the disk. When not in use, the read/write head typically "parks" in a special zone of the disk, usually near the inside edge. The disk surface is texturized in order to prevent the head from sticking onto the surface of the disk when parked. The texture on the disk consists of many small grooves, typically on the order of 40 angstroms from peak to valley, and covers the entire disk even though the disk head parks in only a small zone of the disk.

Texturization of magnetic storage disks is generally accomplished by rotating the disk while bringing to bear upon each side of the disk an abrasive medium supported by a compliant roller. The position of the roller and medium relative to the disk is made to vary toward and away from the center of the disk in an oscillatory manner. The resulting relative motion between the disk surfaces and the abrasive media has two principal components, one due to the rotation of the disk and another due to the oscillatory motion of the abrasive media.

Although the abrasive medium is generally several centimeters wide and contains many thousands of abrasive particles, it is useful to discuss the path traced by a single particle on the surface of the disk. The path of an abrasive particle on the disk will have a continuously varying radius of rotation about the disk center. A texture groove formed by such an abrasive particle thus creates a non-circular pattern having a variable radius. This pattern depends on the oscillatory motion between the disk and medium as well as the rotation of the disk.

It is generally undesirable for the path of a particle to repeat, meaning that the particle retraces the same path on successive rotations of the disk. Repeating patterns cause excessive concentration or depth of texture grooves on the surface of the disk. Repeating patterns are generally caused by unintentional synchronization between disk rotation and oscillation frequency.

It is also undesirable for the texturized disk to have angles between the grooves and path of the read/write head (the "crossing angle") smaller than a given amount. For most applications, crossing angles of the texture grooves should be more than 20 degrees. If the crossing angles of the texture grooves are too small, the read/write head may position incorrectly during operation.

Texture grooves having undesirably small crossing angles are formed when the oscillation velocity (the relative velocity between an abrasive particle and the center of the disk) is too low compared to the rotational speed of the disk. In order to minimize the formation of grooves with low crossing angles, the magnitude of the oscillation velocity ideally should be held above some level. Therefore, sinusoidal oscillating patterns are generally less desirable, since there is a relatively long period of time when the oscillating velocity is low. Conversely, triangular oscillating patterns are idea, since the oscillation velocity is held at a constant magnitude, varying only in sign.

One method of continuously varying the radius of a particle path during the texturizing process involves holding the spindle, about which the disk rotates, stationary with respect to translation while causing the abrasive media rollers and magazines to oscillate translationally in the plane of the disk and along a line coincident with the center of rotation of the disk. An example of an oscillating magazine machine is the model 1800 Automated Surface Finisher made by Exclusive Design Company, which is the assignee of the present invention.

Several disadvantages of oscillating magazine systems stem from the fact that these systems can only oscillate at relatively low frequencies. In order to oscillate both front and back tape rollers and magazines, a structure weighing approximately 95 pounds is continuously accelerated and decelerated. With such a massive structure, the maximum frequency is approximately 10 Hertz using relatively small sinusoidal amplitudes such as 0.01 inches. At amplitudes typical to most applications, such as 0.125 inches, the maximum frequency is approximately 4–5 Hertz. In order to achieve acceptable crossing angles, operating at such low frequencies requires an extremely slow rotational speed for the disk. Thus, overall throughput of such systems is unacceptably low.

Another disadvantage of systems restricted to low oscillation frequencies is that it is difficult to avoid the natural resonance frequencies of the machine. In systems capable of higher oscillating frequencies, the frequency may be increased in order to avoid unacceptable vibrations caused by resonance.

Further problems arise with oscillating magazine systems when designing new texturizing patterns. Traditionally fixed amplitude sinusoidal oscillation patterns have been used. However, disk storage manufacturers increasingly require texture patterns with a semi-triangular oscillation waveform (triangular with parabolic turnarounds). In order to alter the shape of the oscillation curve, each bit of the waveform data file must be individually set by a programmer. In such a system, it is extremely difficult for the user to visualize and to then program an oscillation shape other than a sinusoid. The added programming expense and the likelihood of a long trial-and-error period normally precludes the user from changing the oscillation pattern.

Another problem related to the system's difficulty in programing is that it is difficult for the user to avoid particle path repetition when choosing an oscillation frequency and a disk rotation speed. In order to avoid retracing the same path on successive rotations of the disk, the user is forced to extensively experiment with various speeds and frequencies.

A second method of providing oscillatory motion between the rotating disk and the abrasive media is to hold the abrasive media and rollers stationary while causing the rotating disk to oscillate in directions parallel to the roller contact line. This oscillatory motion is generally accomplished by means of a cam and follower arrangement, wherein the cam is driven by a constant-speed servomotor.

A schematic illustration of a cam system is shown in FIG. 1. As shown, disk 100 is held and rotated by spindle 102 which is driven by servomotor 104. Spindle 102 and servomotor 104 are both mounted on base 130. Cam followers 124 and 126 are held to the surface of cam 122 by force exerted by a preload spring 128. As cam 122 rotates, base 130 oscillates by sliding on linear bearings 132. Disk 100 is thus oscillated relative to a fixed abrasive media roller (not shown). An example of such a spindle oscillation method is illustrated by the model 1800A Automated Surface Finisher made by Exclusive Design Company, the assignee of the present application.

In a cam system, the oscillating spindle and disk are relatively light compared to the abrasive rollers and magazines. Thus, by operating at higher frequencies, the cam system alleviates many of the problems which plague oscillating magazine systems.

However, cam systems have a number of disadvantages. For example, with a cam system the user can easily change the frequency of oscillation and the rotation speed of the disk, but cannot easily change the amplitude or the shape of the oscillation pattern. Adjusting the amplitude or shape of the oscillation pattern requires designing, tooling, and installing an entirely new cam.

The disadvantage of not being able to easily change the amplitude and oscillation shape is especially troublesome when trying to design texturizing patterns having a high degree of triangularity. Although the ideal pattern for avoiding low crossing angles is a perfect triangle, in practice it is necessary to compromise between a triangle and sinusoid since a true triangle pattern requires an infinitely large acceleration of the spindle mass. Thus it is necessary to compromise by using a semi-triangular waveform which limits the maximum acceleration to acceptable levels. This semi-triangular waveform consists of straight lines joined by parabolic sections where direction reversal occurs. The goal is to provide the most triangular waveform possible without exceeding the acceleration limits of the system. For a given frequency and amplitude of the overall waveform, the system's maximum acceleration determines what proportion of the waveform is required to be parabolic. Associated with each frequency and amplitude is an optimum waveform. Thus, not only are different cams necessary for different displacements, but the optimal semi-triangular cam shape is different for every frequency at a given displacement.

Moreover, the problems in designing waveforms are compounded by the fact that the user cannot easily visualize or model a given cam's displacement waveform or the resultant texturizing pattern from a given cam. The texturizing pattern resulting from a given cam is a product of cam shape, rotational speed of both the cam and the spindle, as well as the particular synchronization between rotation and oscillation. Since there is no easy way to visualize or model the resultant texturizing pattern, an extensive amount of experimentation is required when using cam systems.

Problems with maximum acceleration and oscillation frequency arise when using a cam system. For example, the maximum acceleration of the cam system is limited by the preload spring, since at some point the cam followers can no longer be held to the cam surface. On the other hand, if the spring load is increased, excessive wear may occur in the cam followers and the cam surface.

Small variations in cam size and shape as well as variations in the speed of the spindle rotation may result in a substantial degree of variation in the quality of texturization of the disk surface. Variations in cam size and shape may be due to wear, or may be inherent in their manufacture. In related art systems, the accuracy of the spindle rotational speed cannot be accurately controlled since a smooth drive belt must generally be used in order to avoid velocity ripple effects on the texturizing pattern. By using a smooth drive belt, the spindle may experience a significant amount of slip.

Thus, the yield in prior art cam systems is often undesirably low since slight variations in the cam shape or spindle rotation speed may cause a retracing of the same path on successive rotations or unacceptable crossing angles.

As mentioned, magnetic storage disks have different zones, such as a landing or continuous start/stop zone, and a data zone. For disk storage systems, there is an optimal texture intensity and crossing angle for different zones. Therefore, it is desirable to be able to individually specify the crossing angles for each zone. For a given amplitude and frequency, the tangent of the crossing angle at a given point is inversely proportional to the radial distance of that point. This is due to the fact that the outer portions of the disk are moving faster and therefore have smaller crossing angles for a given frequency and amplitude. None of the related art systems allow the user to easily vary the oscillation amplitude or frequency with the mean radius.

Therefore, related art systems cannot easily provide the type of tapered texture areas which are desirable in future magnetic disk storage systems. For example, although the disk head currently only parks in a small zone of the disk, typically near the inner edge, the entire disk is texturized. In general, full texturization is used because the transition between texturized and untexturized zones of the disk when Using the prior art systems is too abrupt. If the transition between textured and untextured zones is not sufficiently smooth, the head operation will be disrupted.

SUMMARY OF THE INVENTION

Thus it is an object of the present invention to provide a method and apparatus for easily specifying, modeling, generating and modifying disk texturizing patterns which are the product of complex oscillatory and rotary motion.

It is a further object of the present invention to provide a method and apparatus capable of synchronizing or modulating the rotation of the disk and oscillatory movement between the disk and abrasive media.

It is a further object of the present invention to provide a method and apparatus capable of producing a texturizing pattern which has a higher degree of triangularity than found in current texturizing systems.

It is a further object of the present invention to provide a method and apparatus capable of relatively high oscillation frequencies in order to increase overall throughput and more easily avoid resonance vibration.

It is a further object of the present invention to provide a method and apparatus which is less susceptible to yield problems caused by variability of the oscillation movement and the spindle rotation.

It is a further object of the present invention to provide a method and apparatus which is capable of varying the oscillation amplitude and frequency as a function of the mean radius of the zone of the disk being texturized.

In order to meet these objectives, the present invention is directed to a method and apparatus for texturizing a disk which rotates the disk while a texturizing media is applied to the surface of the disk. The disk is oscillated across the texturizing media using a servomotor and a leadscrew arrangement. The method and apparatus according to the invention is thus capable of oscillatory movement having various amplitudes and waveform shapes, as well as relatively high frequencies.

According to a preferred embodiment of the invention, closed-loop control systems are used to monitor and accurately position both the rotation of the disk relative to some starting rotational position and the linear position of the disk relative to the texturizing media. Thus, the method and apparatus according to the invention is less susceptible to problems associated with variability of oscillatory movement and spindle rotation such as repeating texture patterns or unacceptable crossing angles.

The disk rotation speed may be modulated in coordination with the oscillatory movement using the closed-loop control systems. By reducing the rotational speed of the disk at the times when the oscillatory movement reverses directions, texturizing patterns having a high degree of triangularity may be achieved.

Also according to a preferred embodiment, a pattern generation system and a graphical user interface are provided for specifying, modeling, generating, modifying and visually displaying texturizing patterns. Generated texturizing patterns may be displayed both as a polar plot and a linear plot. The pattern generation system also provides signals to warn of two conditions: a generated texturizing pattern exceeds the acceleration or amplitude limitations of the physical texturizing apparatus; or the texturizing pattern is repeating. Repeating patterns may be identified by using an algorithm implemented in the pattern generation system. The pattern generation system may also be used to create a bit file which is readable by the physical disk texturizing apparatus.

DETAILED DESCRIPTION OF THE INVENTION

Figure 1:
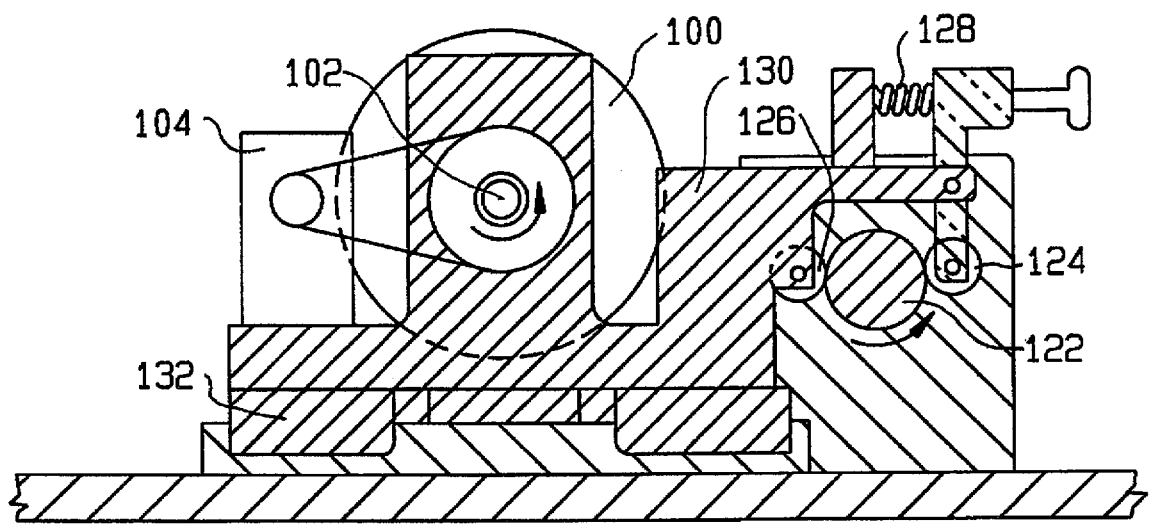
FIG. 1 is a schematic side view of a prior art cam-based disk texturizing apparatus.

The following embodiments of the present invention will be described in the context of a method and apparatus for texturizing magnetic storage disks, although those skilled in the art will recognize that the disclosed methods and structures are readily adaptable for broader application. For example, the invention is applicable to the processing of other types of disks as well as semiconductor wafers. Note that whenever the same reference numeral is repeated with respect to different figures, it refers to the corresponding structure in each such figure.

Figure 2:
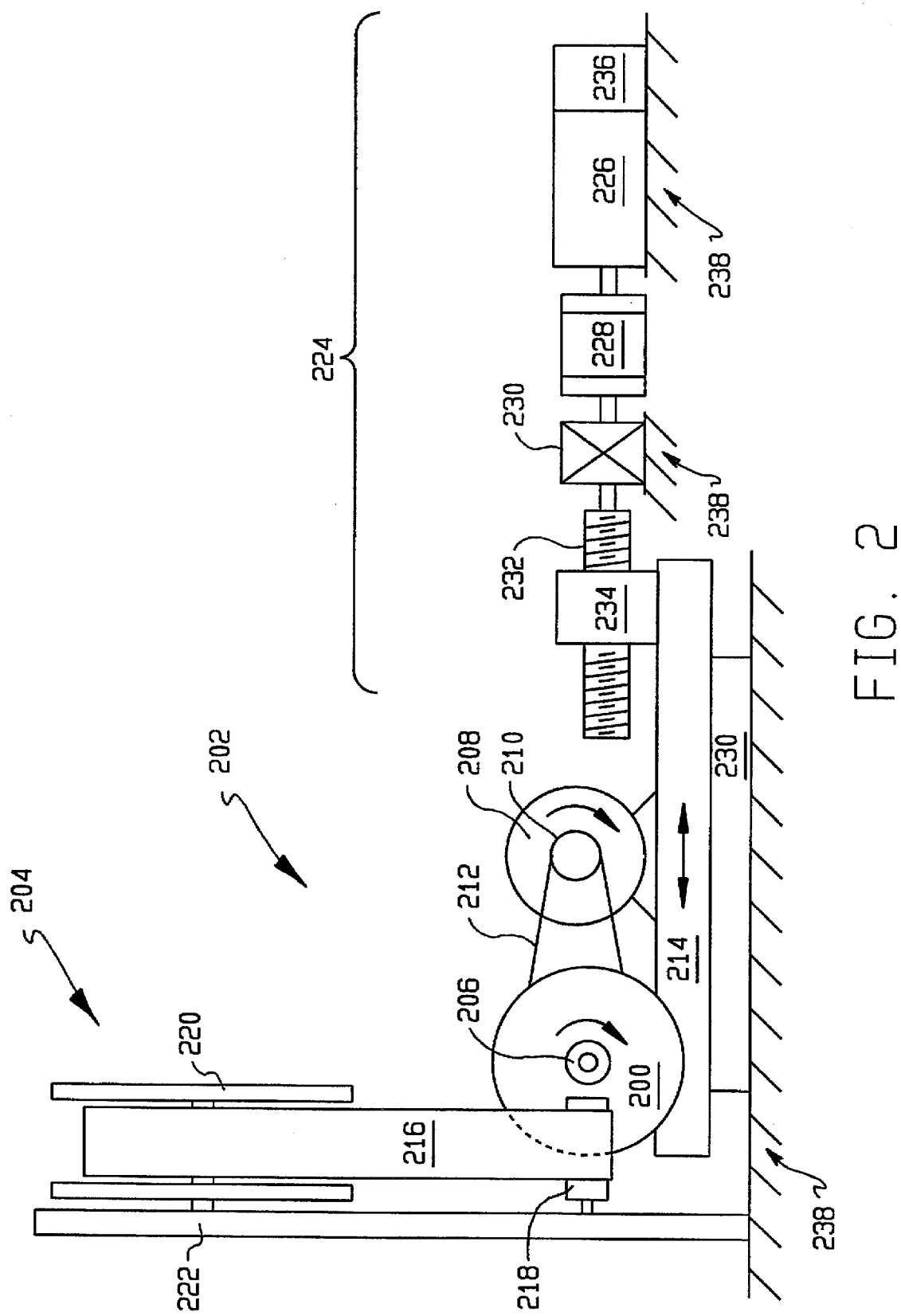
FIG. 2 is a simplified side view of a disk texturizing apparatus according to the present invention.

Important features of a disk texturizing apparatus and method according to the present invention can be appreciated by referring to FIG. 2 which shows a disk 200 being texturized. The apparatus in FIG. 2 comprises three major assemblies: a spindle rotation system 202 which rotates the disk, an oscillatory system 224 which oscillates the disk, and an abrasive media system 204 which applies abrasive media to the surfaces of the disk. The spindle rotation system 202 and the oscillatory system 224 both preferably comprise closed-loop control systems which precisely monitor and control the rotational and oscillatory position of the disk.

As shown in FIG. 2, spindle rotation system 202 comprises spindle 206 for clamping and rotating the disk. Spindle 206 is rotated by rotation servomotor 208 via motor pulley 210 and belt 212. Spindle 206 and rotation servomotor 208 are both fixedly mounted on base 214, which is slidably mounted on linear bearings 230 such that base 214 can move in horizontal directions parallel to the plane of disk 200, as shown in FIG. 2.

Abrasive media system 204 comprises abrasive tapes 216, which are applied to the front and back surfaces of disk 200 by two load rollers 218, one on either side of the disk. Abrasive tapes 216 are supplied and taken up by magazine system 220, which is mounted to a magazine frame 222. As shown, load rollers 218 are also mounted to magazine frame 222. Magazine frame 222 holds abrasive media system 204 in a fixed position relative to table 238 during texturization of the disk. Typically, the advance speed of the abrasive tape is quite slow relative to the rotational and oscillatory motion of the disk, and thus for reasons of clarity it is not included in the description of the motion as set forth herein.

Oscillatory system 224 provides precise position control of the oscillatory motion of the disk. Servomotor 226 rotates a shaft which is connected via flexible coupling 228 to another shaft which is supported by a bearing 230. Note that both servomotor 226 and bearing 230 are fixedly mounted onto table 238. Leadscrew 232 and leadnut 234 operate to convert rotational motion of the shaft to linear motion of base 214. Also shown in FIG. 2 is a digital encoder/tachometer 236 which is used to measure the rotational speed and position of servomotor 226. Preferably, encoder/tachometer 236 is an incremental encoder, which outputs step-by-step position and direction information.

Note that servomotor 226 and rotation servomotor 208 need to be of a type which provide not only precise control over rotational speed, but also precise control over the rotational position and further provide a substantial amount of peak force capacity. One skilled in the art could select servomotors 226 and 208 from a variety of suitable servomotors which are commercially available.

In a preferred alternative embodiment, a counter balance is used to offset the force applied to table 238 due to the continuous acceleration and deceleration of spindle rotation system 202 during oscillation. A detailed discussion of such a counter balance is disclosed in U.S. patent application Ser. No. 08/397,622 entitled "Counter Balance for Disk Texturizing Apparatus" which has been filed con-currently herewith, and is hereby incorporated in its entirety by reference thereto.

Figure 3:
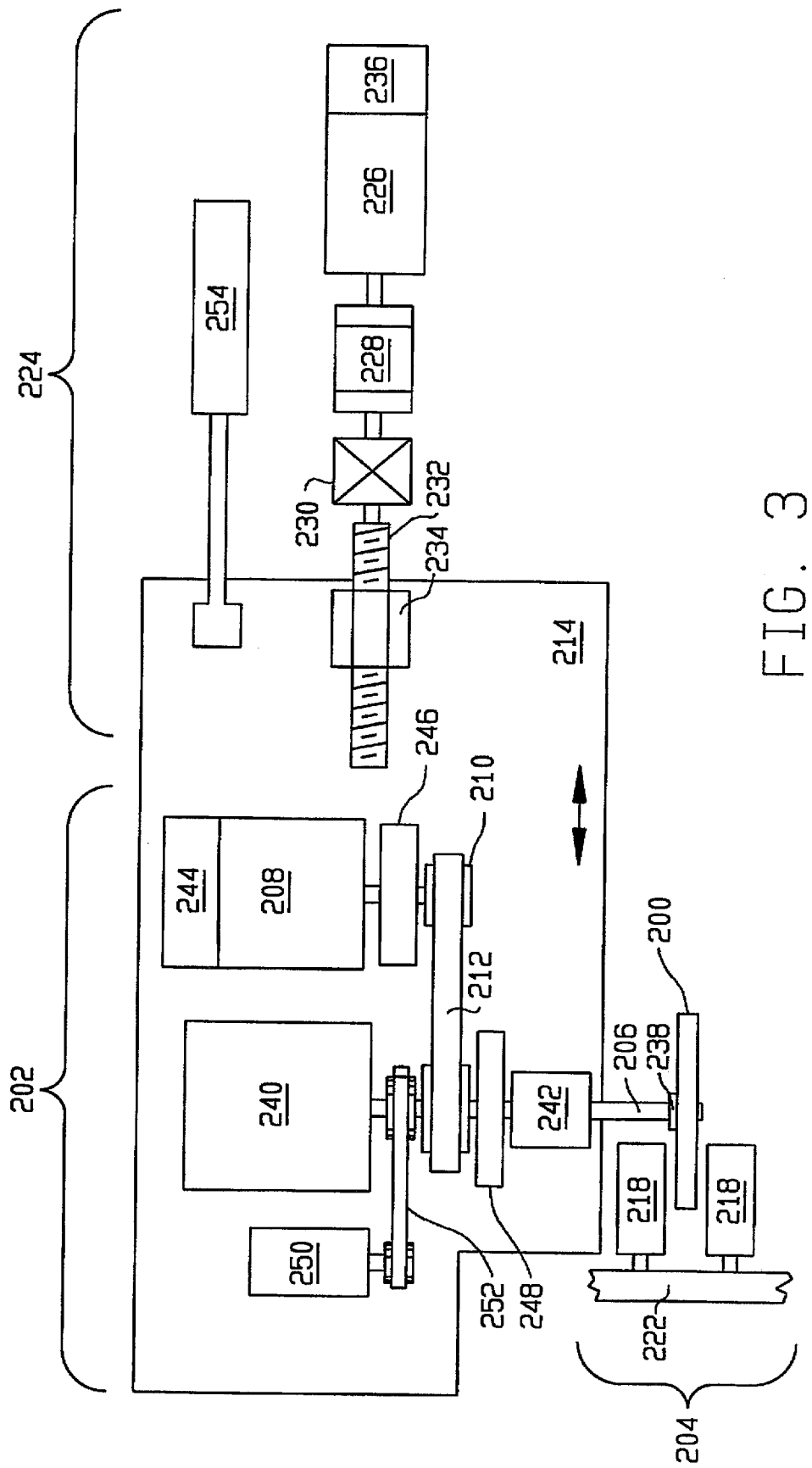
FIG. 3 is a simplified top view of a disk texturizing apparatus according to the present invention.

FIG. 3 is a schematic top view of the apparatus of FIG. 2 for texturizing a disk according to the present invention.

Note that spindle rotation system 202 is shown to further comprise a collet 238 which is used to clamp the inner edge of disk 200. Collet 238 preferably has a number of sections which are expanded by an internal expander cone to clamp the inner edge of the disk. The expander cone is attached to a narrow rod which passes through spindle 206. Collet actuator mechanism 240 retracts the rod which forces the cone to expand the sections on the collet, thereby clamping the inner edge of the disk.

Spindle bearing 242 holds spindle 206 in a fixed position relative to base 214. Also shown connected to rotation servomotor 208 is a digital encoder/tachometer 244 which provides the control system with the precise rotational speed of the rotation servomotor 208. Preferably encoder/tachometer 244 is an incremental encoder, which outputs step-by-step position and direction information.

In order to provide a closed-loop control system for accurately positioning the spindle rotation, a precise measurement means should be provided which is directly driven by spindle 206, since variable slip may occur in belt 212. Note that belt 212 is preferably smooth rather than toothed, since the later has cyclic irregularities which cause velocity ripple. Velocity ripple is undesirable since it is ultimately manifested as variations in the texturizing pattern. To close the control loop, a shaft-mounted digital encoder 248 may be used. However, for cost efficiency, the presently preferred embodiment uses a separate spindle rotation encoder 250 which is a digital encoder synchronized to the spindle by cogbelt 252. The low torque required to drive the spindle rotation encoder 250 permits the use of a cogbelt, the pitch of which is fine compared to the pitch of a cogbelt which might have been used as the primary transmission means. By using a fine pitch, the velocity ripple due to the cogbelt 252 is lower in magnitude as well as higher in frequency. Typically, encoders 248 and 250 are not used together, but they are shown together in FIG. 3 for convenience of description.

Directly attached to the shaft of rotation servomotor 208 is flywheel 246 for the purpose of making the motor shaft-mounted inertia predominate as a fraction of the total inertia. This primarily allows high gain in the spindle rotational velocity control loop without exciting a dumbbell resonance arising from the motor and spindle inertias connected by the spring constant associated with the compliance of belt 212. The combination of high inertia and high gain allows the achievement of high dynamic stiffness without high dynamic position loop gain, hence reducing the high-frequency responsiveness to variations such as velocity ripple caused by toothed belt 252.

In order to close the control loop in oscillatory system 224, a preferred embodiment includes a linear digital encoder 254 which accurately measures the position of base 214. Linear digital encoder 254 may contain a home sensor, to further aid in precisely positioning base 214.

Thus according to the invention, an apparatus and method are provided which advantageously allows a plurality of texturizing patterns without replacement of a fixed mechanical cam, as well as advantageously allowing oscillations at relatively high frequencies.

In an alternative embodiment of the invention, in order to reduce cost, linear digital encoder 254 is not used. Rather, digital encoder/tachometer 236 is used to supply information to close the control-loop for the oscillation position system 224. Though indirect, the relation of rotary displacement of the servomotor to linear displacement of the base 214 is linear and fixed. Digital encoder/tachometer 236 may contain a home sensor, to further aid in precisely positioning base 214.

In another alternative embodiment of the invention, a linear servomotor is used to position base 214 directly, rather than using a rotatory servomotor and leadscrew arrangement. In this embodiment, linear digital encoder 254 is used to close the control loop in the oscillation position system 224.

Figure 4:
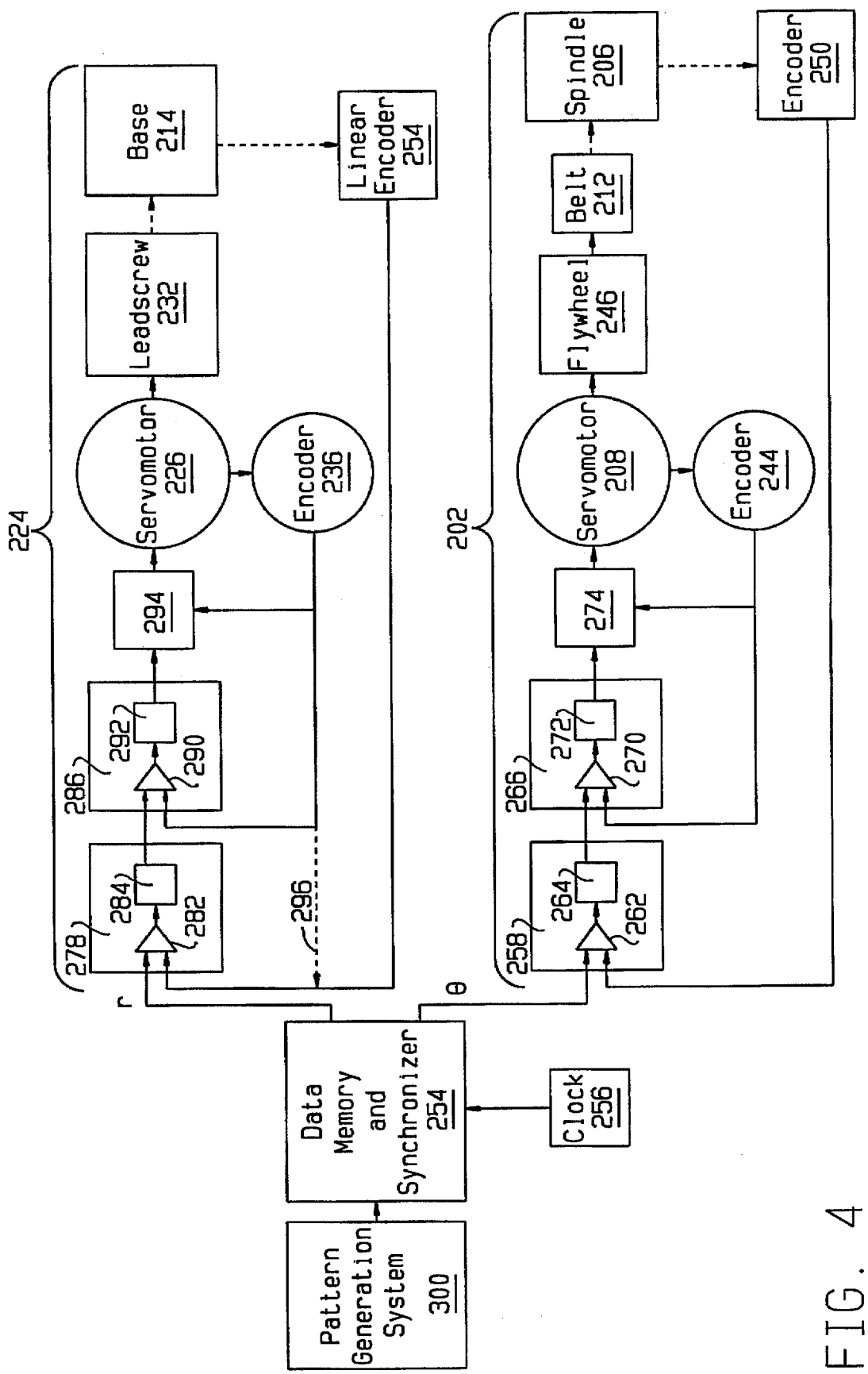
FIG. 4 is a block diagram of a method and apparatus for texturizing a disk, according to the present invention.

FIG. 4 depicts a block diagram of the control electronics for the disk texturizing system according to the invention. The control comprises a pattern generation system 300, a data memory and synchronizer 255, a clock 256 and various elements of spindle rotation system 202 and oscillatory system 224. Pattern generation system 300 comprises an extensive software structure for designing, modeling and modifying disk texturizing patterns. It creates a pattern data file which defines in detail a texturizing pattern. The pattern data file is a bit file indicating the exact angular and linear positions required for a given texturizing pattern. It is transferred, by means of a floppy disk or data link to data memory and synchronizer 255 for storing the pattern data file for use by spindle rotation system 202 and oscillatory system 224, and for synchronizing the two systems. In order to synchronize the spindle rotation and oscillation position systems 202 and 224, relative-time clock 256 is provided. The pattern generation system is described in more detail below. One skilled in the art would recognize that data memory and synchronizer 255 may be provided by a commercially available microcomputer based controller board.

The spindle rotation system 202 comprises a rotational position controller 258, a rotational velocity controller 266 and a rotation signal amplifier/commutator 274. Rotational position controller 258 is provided for receiving the spindle rotation data from the pattern data file, making any compensation necessary according to the position information from spindle rotation encoder 250, and transforming the resultant data into velocity analog form. Differential amplifier 262 compares the position data from the pattern data file with the actual position data from the spindle rotation encoder 250. The result of the comparison is provided to a position feedback compensation calculator 264, which calculates an appropriate velocity in order to conform the actual position to the position requested by the pattern data file. According to the preferred embodiment, the position feedback compensation calculator 264 is a simple proportional gain function, although those skilled in the art would recognize that other gain functions could be used.

The output signal from rotational position controller 258, in the form of a velocity analog, is provided to rotational velocity controller 266 which determines the appropriate torque required for the spindle to attain the required velocity. Differential amplifier 270 compares the velocity analog signal from rotational position controller 258 with the actual velocity of the servomotor, provided by digital encoder/tachometer 244 and the result is sent to rotation velocity feedback compensation calculator 272.

Velocity feedback compensation calculator 272 calculates the torque necessary in order for the spindle to attain the velocity required by rotational position controller 258. For example, velocity feedback compensation calculator 272 may be represented by the equation:

$$H(s) = \frac{K\omega_T(s + \omega_0)}{s(s + \omega_T)}$$

where H(s) is the velocity feedback compensation function and s is the Laplacian operator. $\omega_0$ is adjusted to match the corner frequency of the inertia pole of spindle rotation system 202. $\omega_T$ is adjusted to eliminate amplifier high-frequency response which is beyond the mechanical bandwidth of spindle rotation system 202 and is therefore unnecessary and contributes only heat and acoustic noise. K is the velocity loop midband gain. One skilled in the art will recognize that other feedback compensation functions may be substituted for this example.

The output of rotational velocity controller 266, in the form of a torque analog signal is fed to rotation signal amplifier/commutator 274 which amplifies the correct polarity signal to drive rotation servomotor 208. Note that encoder/tachometer 244 must provide position and direction information to amplifier/commutator 274 in order to proportion the current and govern the polarity of the drive signal. As shown in FIG. 4, the signal from amplifier/commutator 274 then drives rotation servomotor 208 which spins flywheel 246 and ultimately spindle 206, via belt 212.

By providing a spindle rotation system 202 that has closed-loop control over both position and velocity, the disk texturizing apparatus can advantageously control the exact rotational position of the spindle with respect to a defined starting position. This capability is necessary to avoid repeating patterns. For example, if slip occurs in belt 212 which causes an offset in the actual rotational position of the spindle, a repeating pattern may occur even if the frequencies of the rotation and oscillation have been correctly selected. According to the present invention, any offset due to belt slippage would be immediately detected and compensated for by spindle position controller 258.

As shown in FIG. 4, oscillatory system 224 comprises a linear position controller 278, a velocity controller 286 and a signal amplifier/commutator 294. Linear position controller 278 converts the position data from the pattern data file and linear encoder 254 into a velocity analog signal. A differential amplifier 282 compares the position data from the pattern data file with the position data from linear encoder 254. The result of the comparison is provided to a position feedback compensation 284, which calculates the necessary velocity to achieve the position required by the pattern data file. Feedback compensation calculator 284 is a simple proportional gain and has a velocity analog signal as an output. Rotational position controller 258, as well as linear position controller 278, may be provided by a commercially available controller board familiar to those skilled in the art of servo control.

The output signal from linear position controller 278 is provided to velocity controller 286 which calculates the torque needed to match the velocity requested by linear position controller 278. Differential amplifier 290 compares the requested velocity from linear position controller 278 with the actual velocity of servomotor 226 provided by encoder/tachometer 236. The difference in requested versus actual velocity is sent to velocity feedback compensation calculator 292 which calculates the torque required to bring the velocity of servomotor 226 to that requested by linear position controller 278. According to the preferred embodiment, velocity feedback compensation calculator 292 is a complex time-dependent function such as the example previously discussed in connection with feedback compensation calculator 272, although those skilled in the art could substitute other functions for this example.

The output of velocity controller 286, in the form of a torque analog signal, is fed to signal amplifier/commutator 294 which amplifies the correct polarity signal to drive servomotor 226. Note that encoder/tachometer 236 must provide position and direction information to amplifier/commutator 294 in order to amplify the current and govern the polarity of the drive signal. Velocity controllers 266 and 286 as well as amplifier/commutators 274 and 294 may be provided by commercially available velocity servomotor drives familiar to those skilled in the art of servo control. The signal from amplifier/commutator 294 then drives servomotor 226 which turns leadscrew 232 which transforms the rotational motion into linear motion in base 214.

Thus, unlike the prior systems, the present invention advantageously provides the capability of accurately positioning the spindle using a closed loop control system, according to an infinite number of oscillation patterns.

As previously noted, in another embodiment linear encoder 254 is not implemented, and the linear position is calculated from the rotational position information provided by encoder/tachometer 236. According to this embodiment, signal line 296, shown as a dotted line in FIG. 4, connects encoder/tachometer 236 with linear position controller 278.

Although the control systems described above are described according to the presently preferred embodiment as well as other embodiments, such description is not intended to limit such a control system to these embodiments alone. For example, in view of this disclosure, one skilled in the art will recognize that the above described control system could be used to precisely position and synchronize the movements of texturizing systems where the texturizing media is oscillated as well as or instead of the rotating spindle.

Since the spindle rotation speed and position may be precisely synchronized with the oscillating motion, the present invention advantageously provides the capability to produce texturizing patterns having more triangular waveforms than previously possible.

The proportion of triangularity in a waveform is limited by the frequency and amplitude of oscillation, and the rotation speed of the disk, for systems with constant spindle speeds. However, as a high degree of synchronization is possible according to the present invention, the spindle speed may be variable, being modulated with the oscillatory motion.

According to this embodiment, the spindle rotation speed may be cyclically varied in synchronization with the oscillatory motion. To produce a high degree of triangularity in the texturization pattern, each straight line segment of the triangular waveform may be created by the coordination of the oscillatory movement and the spindle rotation at speeds in linear proportion to each other. The spindle rotation speed is cyclically varied between zero and some maximum while the oscillation speed is varied proportionally. The proportionality coefficient changes sign to reverse the slope of each succeeding segment of the triangular waveform. The end of a linear segment is reached when both speeds simultaneously reach zero. The next segment begins from zero velocity with the oscillator velocity reversed from the prior segment. For example, the spindle speed may be described mathematically by $K1*(1+\sin(\omega t))$, while the oscillator velocity may be described as $+/-K2*(1+\sin(\omega t))$, where $K1$ is the average spindle speed, $\omega$ is the angular frequency of oscillation, and $K2$ is the average oscillator speed necessary to produce the desired oscillator peak displacement.

By modulating the spindle rotation speed and the oscillatory motion, a near-perfect triangular texturizing pattern may be realized. Additionally, note that an infinite number of alternative texturizing waveforms are now advantageously possible by such modulation.

Figure 5:
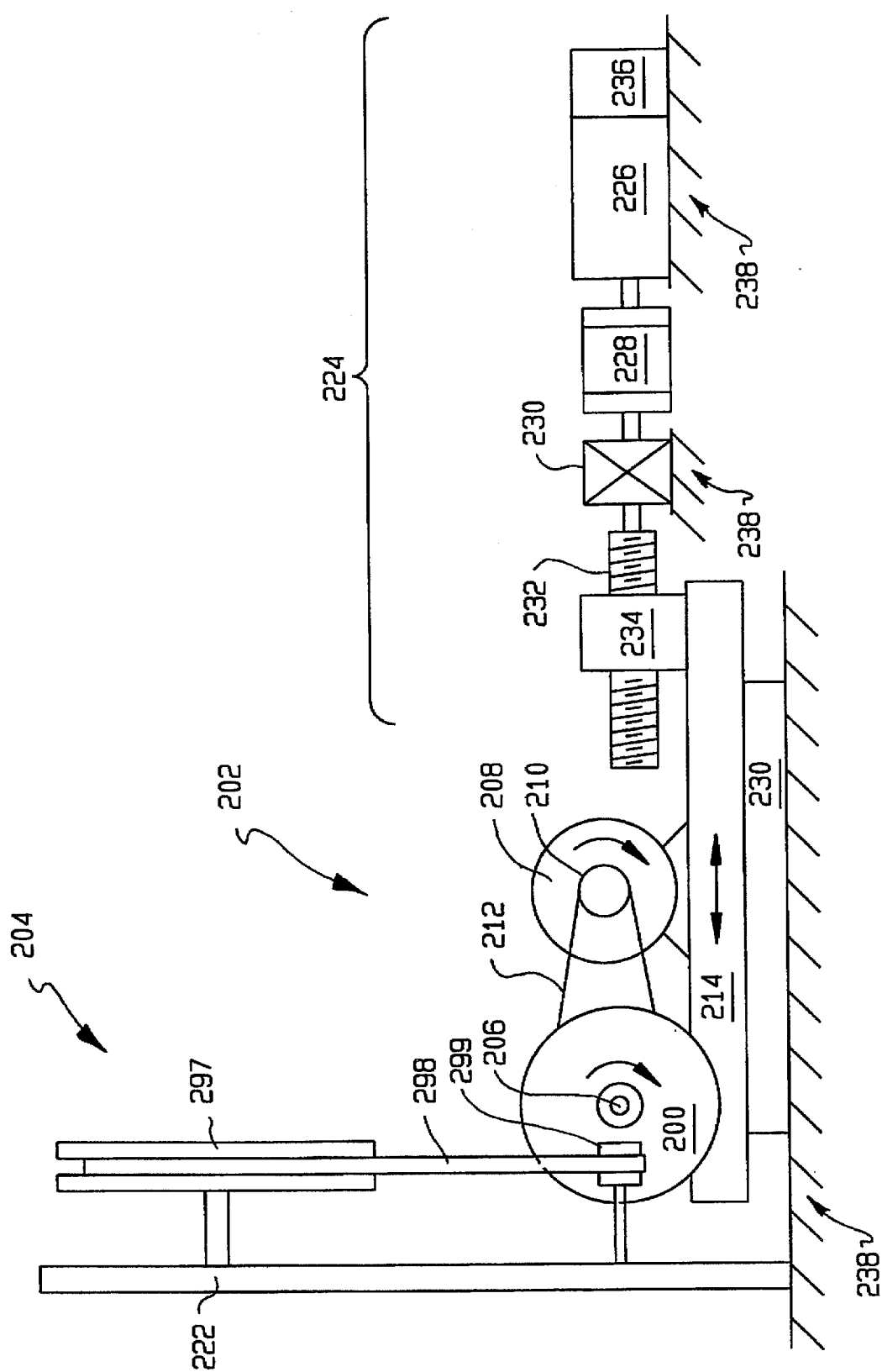
FIG. 5 is a simplified side view of a disk texturizing apparatus according to another embodiment of the present invention.

FIG. 5 describes another embodiment of the invention. In this embodiment the spindle rotation system 202 and the oscillation position system 224 are substantially similar to the previous embodiments described in connection with FIG. 2. However, the abrasive media system 204 now comprises a narrow abrasive medium 298, narrow load rollers 299 and a narrow magazine system 297. According to this embodiment, abrasive medium 298 is narrow relative to the portion of the disk which is to be texturized.

Advantageously, this embodiment is capable of individually texturizing different zones of the disk. For example, a landing or continuous start/stop zone can be texturized according to a different texturizing pattern than is a data zone. The control system according to the present invention allows the user to individually determine the crossing angle and texture intensity for each different zone, by varying the oscillation amplitude and frequency with the mean radius of the zone of the disk being texturized. According to this embodiment, a transition zone between the data zone and the landing zone may be of a tapered intensity, allowing for a smooth transition of texture intensity between adjacent zones on the disk.

As mentioned, it is undesirable for a disk to have small crossing angles (e.g., zero to about ten degrees) between the grooves caused by texturizing and the path of the read/write head. If the crossing angle is too small, the read/write head may position incorrectly during operation. Thus, triangular texturizing patterns are ideal when texturizing disks. However, as also noted previously, a perfectly triangular texturizing pattern is impracticable as it requires infinite acceleration of the spindle mass unless the spindle rotation is completely stopped when the spindle mass reverses direction. Thus, it is desirable to compromise by using semi-triangular oscillation patterns which consist of straight lines joined by parabolic sections where direction reversal occurs.

Figure 6:
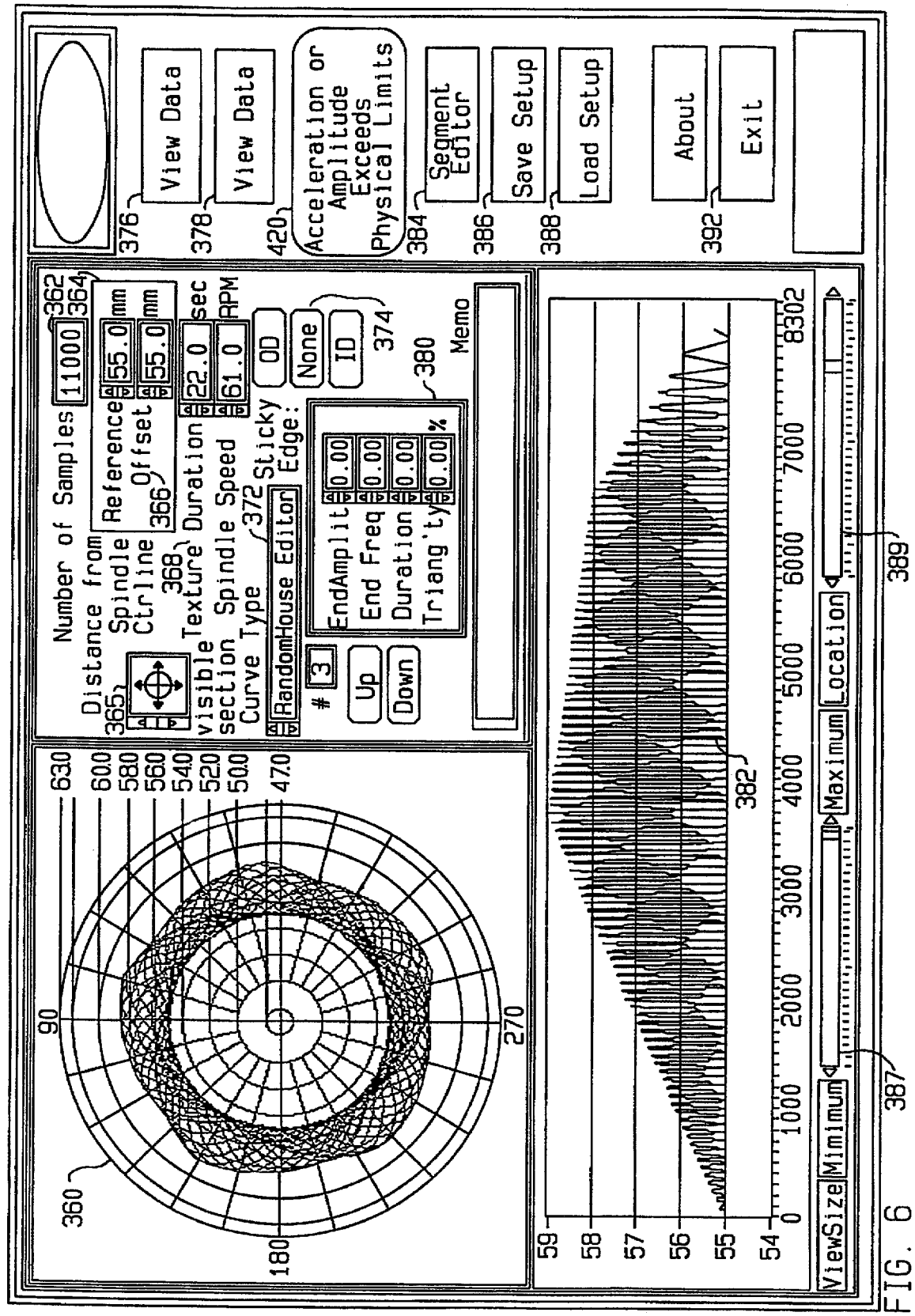
FIG. 6 illustrates an example of graphically displayed information using the interface of the invention.

Pattern generation system 300 provides the user with a means for specifying, modeling, generating, and modifying the optimal semi-triangular texturizing patterns for a particular texturizing apparatus. FIG. 6 illustrates a preferred embodiment of a graphical user interface 301 of pattern generation system 300. This preferred embodiment was created using the LabVIEW® program development application of National Instruments Corporation. LabVIEW® is a general-purpose programming system with extensive libraries of functions for any programming task, including data acquisition, instrument control, data analysis, data presentation, and data storage. The LabVIEW® software program which implements the preferred embodiment of the graphical user interface of the invention is attached as FIGS. 11–20. It is to be understood that although the invention is described using as an example the LabVIEW® programming environment, any method or apparatus for graphically displaying a user interface according to the invention is contemplated to fall within the scope of the invention.

User interface 301 enables the user to select from and utilize a number of functions which relate to the modeling and generation of texturizing patterns. In particular, user interface 301 allows the user to select from the following functions: go to segment editor 384, view or modify segment settings 380, change window view size 387 and window view location 389, view data in a spreadsheet format 376, change visible section 365, select curve type 372, load data sequence 388, save data sequence 386, and export data sequence 378.

The primary focus of user interface 301 is polar plot 360 which graphically displays a generated texturizing pattern as it will appear on a disk which has been texturized using the pattern. Polar plot 360 allows the user to graphically view the generated pattern and determine if any undesirable pattern overlap is occurring. This is advantageous over the prior systems which required extensive and costly experimentation to determine non-repeating texturizing patterns because no easy means for visualizing generated patterns existed. Visible section feature 365 allows the user to view specific portions of polar plot 360 in zoomed-in fashion, such as a single quadrant or half-circle.

Linear graphical view 382 allows the user to view the generated texturizing pattern in a linear plot. Linear graphical view 382 may be altered by either moving the window of the linear graphical view 382 in relation to the texturizing pattern (slide bar 389) or increasing or decreasing the actual window size (slide bar 387). Window size does not refer to the physical window size, which remains constant in user interface 301, but in fact refers to the amount of a particular pattern that can be viewed at one time in this physically static window area. Thus, the window size is considered to be at maximum when the entire pattern can be viewed in the window, and is at a minimum when a small section of the pattern is greatly zoomed in and encompasses the entire physically static window area. Thus, when the window size is maximized, window location slide bar 389 may not be moved as space beyond the ends of the pattern cannot be viewed in user interface 301. However, when the window size is small, the window displaying zoomed in sections of the pattern can be moved along the entire length of that pattern with slide bar 389.

Figure 7:
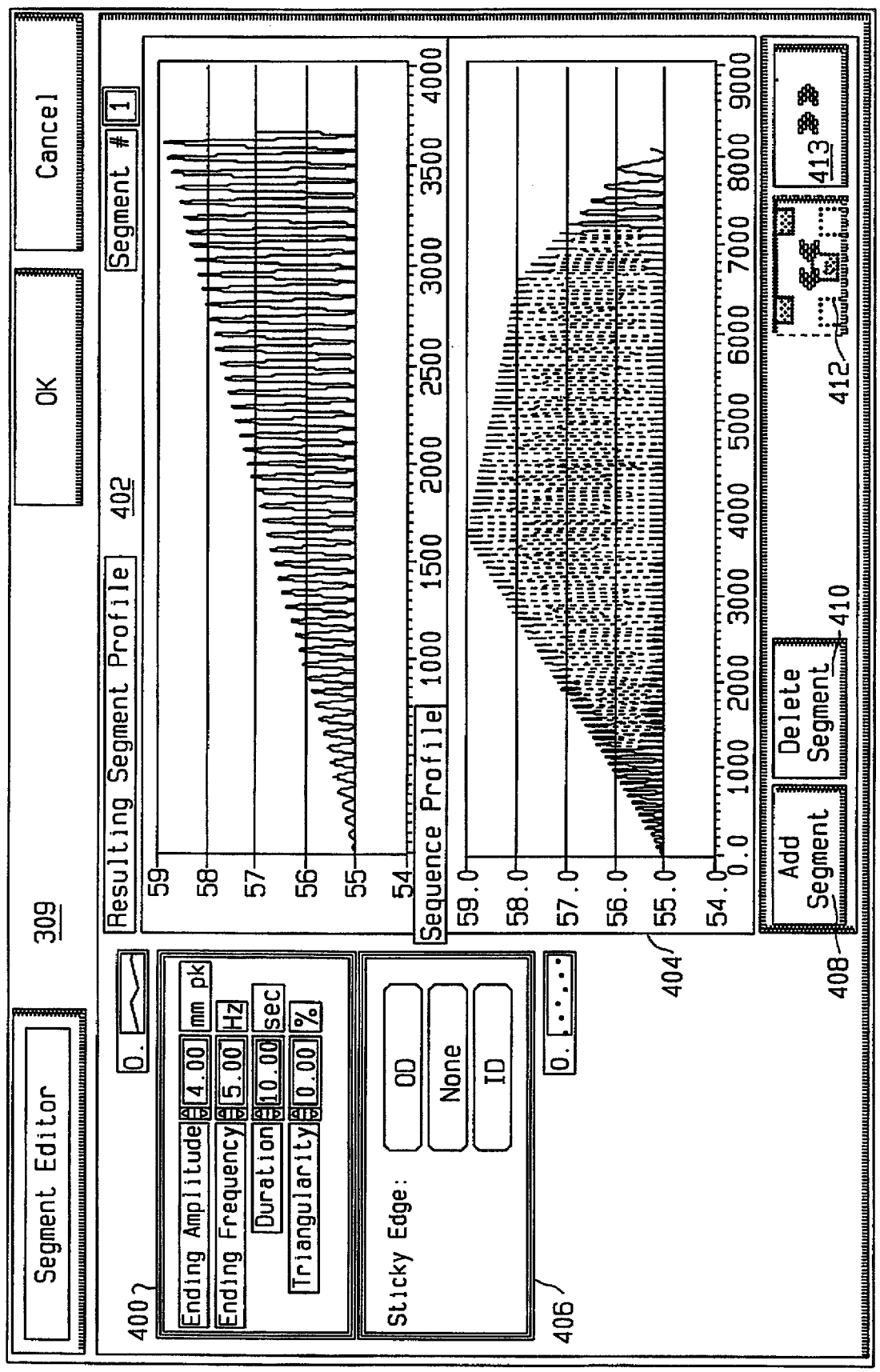
FIG. 7 illustrates an example of graphically displayed information of the segment editor.

Segment editor 384 is the primary tool by which the user generates texturizing patterns in pattern generation system 300. FIG. 7 illustrates the graphical user interface of segment editor 384. As will be discussed in detail below, texturizing patterns are made up of segments. Segment editor 384 allows the user to add segments to or delete segments from a texturizing pattern. Box 400 of segment editor 384 allows the user to view the settings of a previously generated segment or alternatively, input settings for a segment to be added. Box 402 graphically displays any segment in a pattern, including a segment that has just been generated. Box 404 graphically displays the entire texturizing pattern in a linear plot. In box 404 is shown a pattern which has been acted on by sticky edge function 406, which is described in detail below. Specifically, sticky edge function 406 has forced the texturizing pattern to the inside diameter of the disk. Button 408 allows the user to add a new segment to the texturizing pattern shown in box 404, while button 410 allows the deletion of the same segment. Finally buttons 412 and 413 allow the user to switch from segment to segment within the pattern being viewed. If segment editor 384 is used to add, delete, or modify segment, a swept semi-triangular wave generator 320 (shown in FIG. 8 and discussed in detail below) will generate a data sequence which describes the added or modified segment. Thus, when it is necessary to regenerate a saved segment, the system simply refers to the saved data sequence corresponding to the particular segment to be regenerated.

Figure 9:
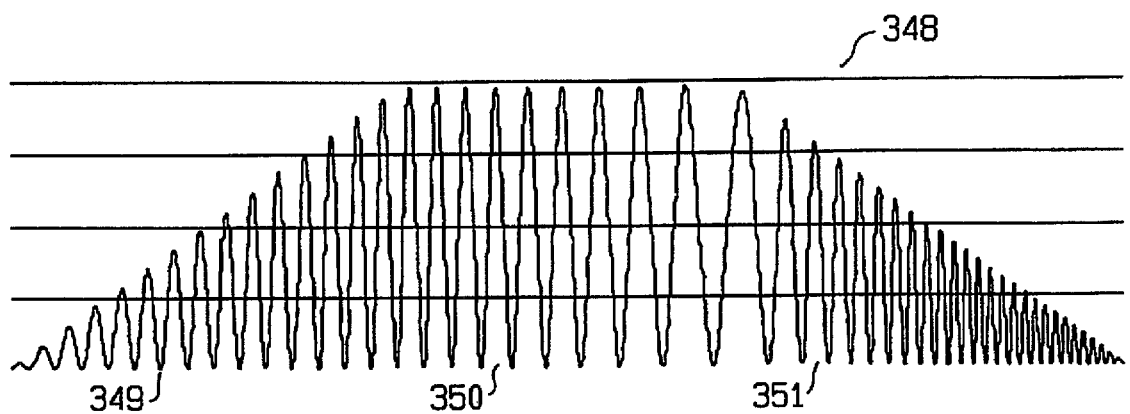
FIG. 9 illustrates a sample texturizing pattern on a linear plot.
Figure 10:
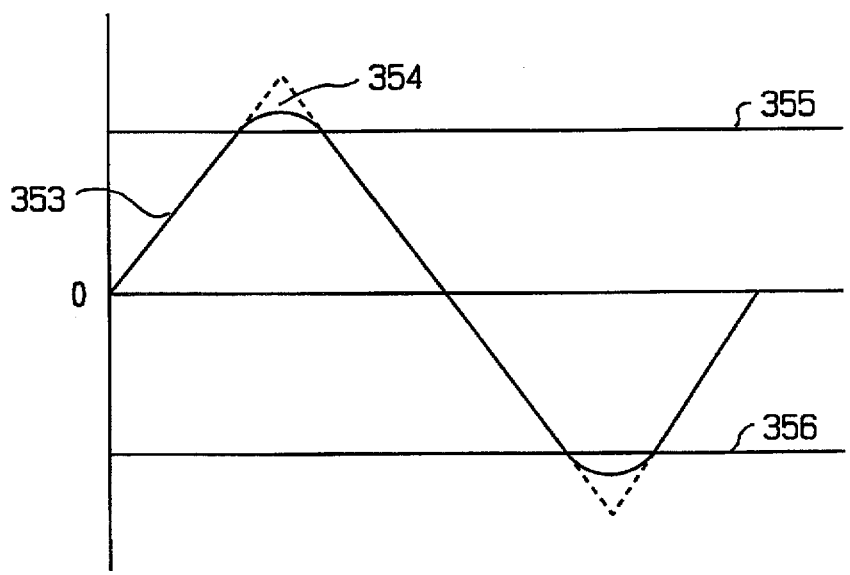
FIG. 10 illustrates one cycle in a semi-triangular texturizing pattern.
Figure 11:
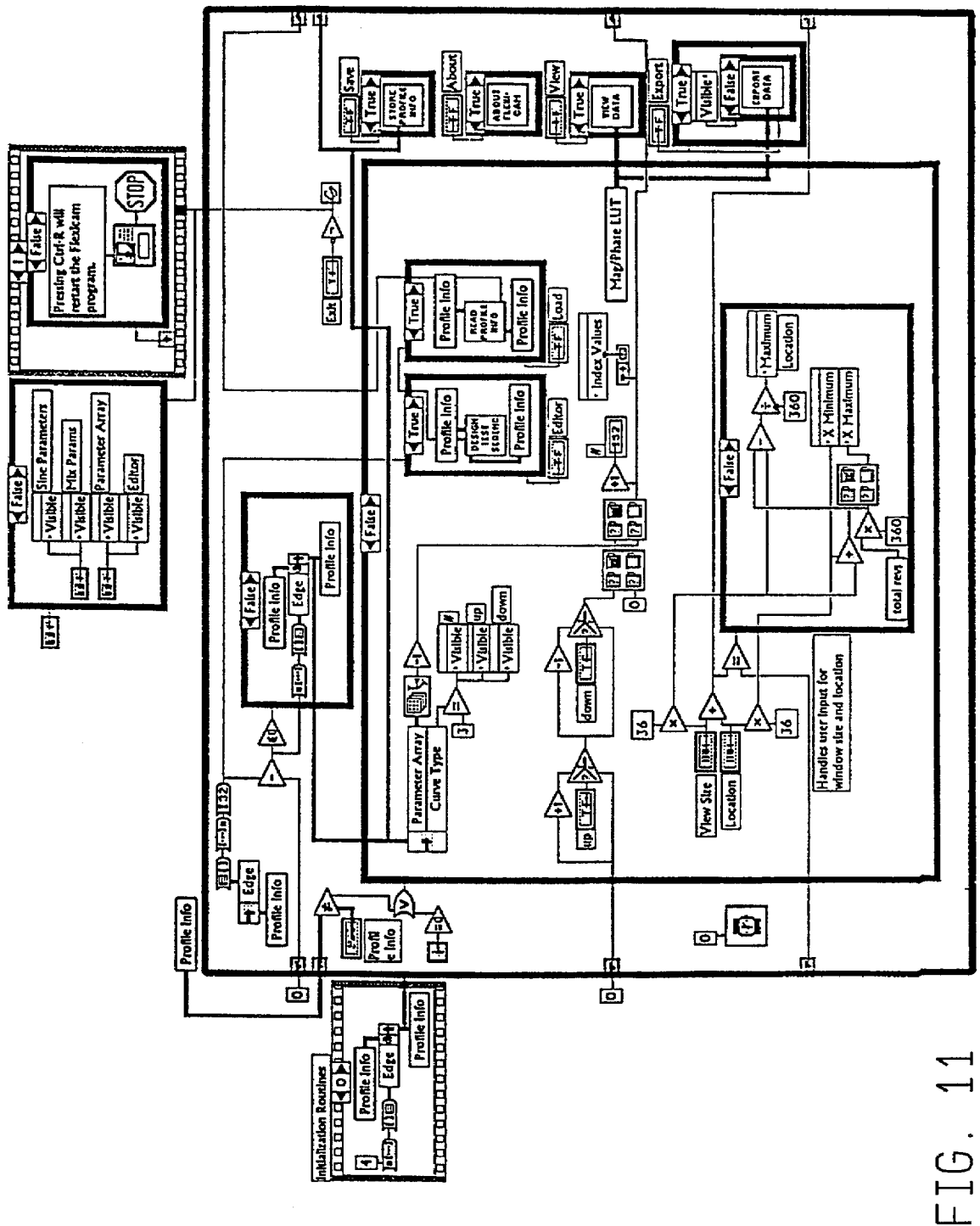
FIGS. 11–20 illustrate a software program used to implement a perferred embodiment of the present invention.
Figure 12:
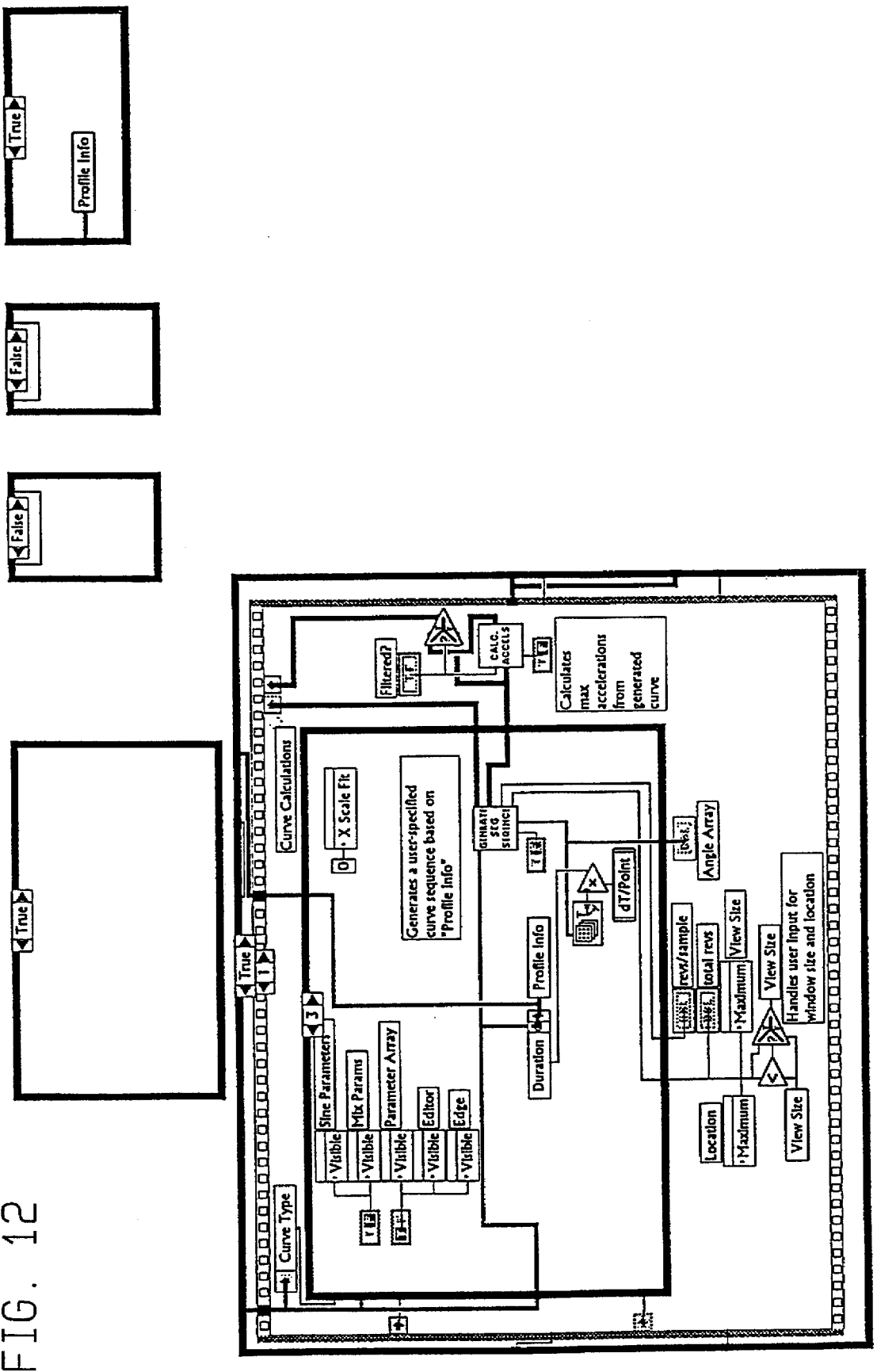
Figure 13:
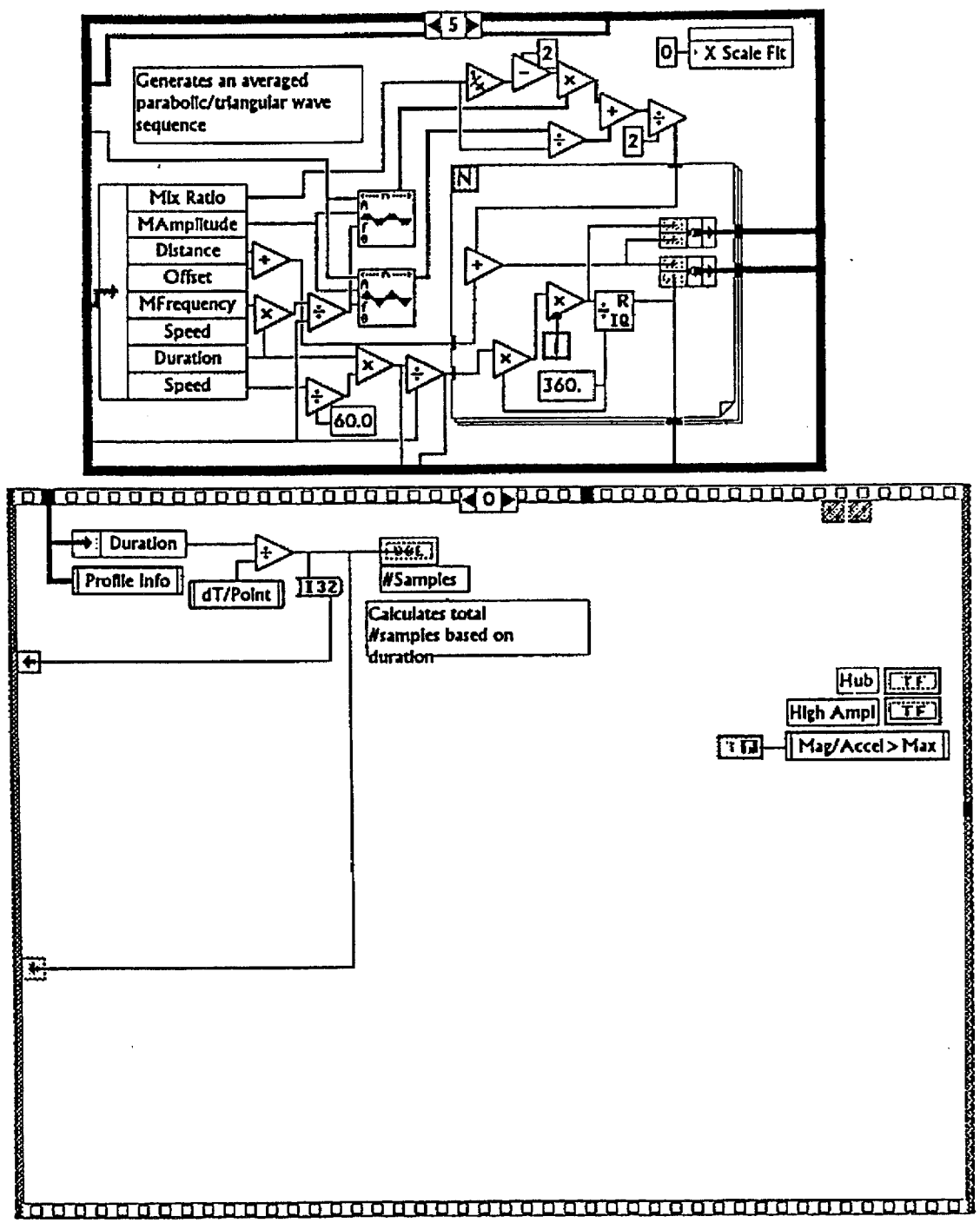
Figure 14:
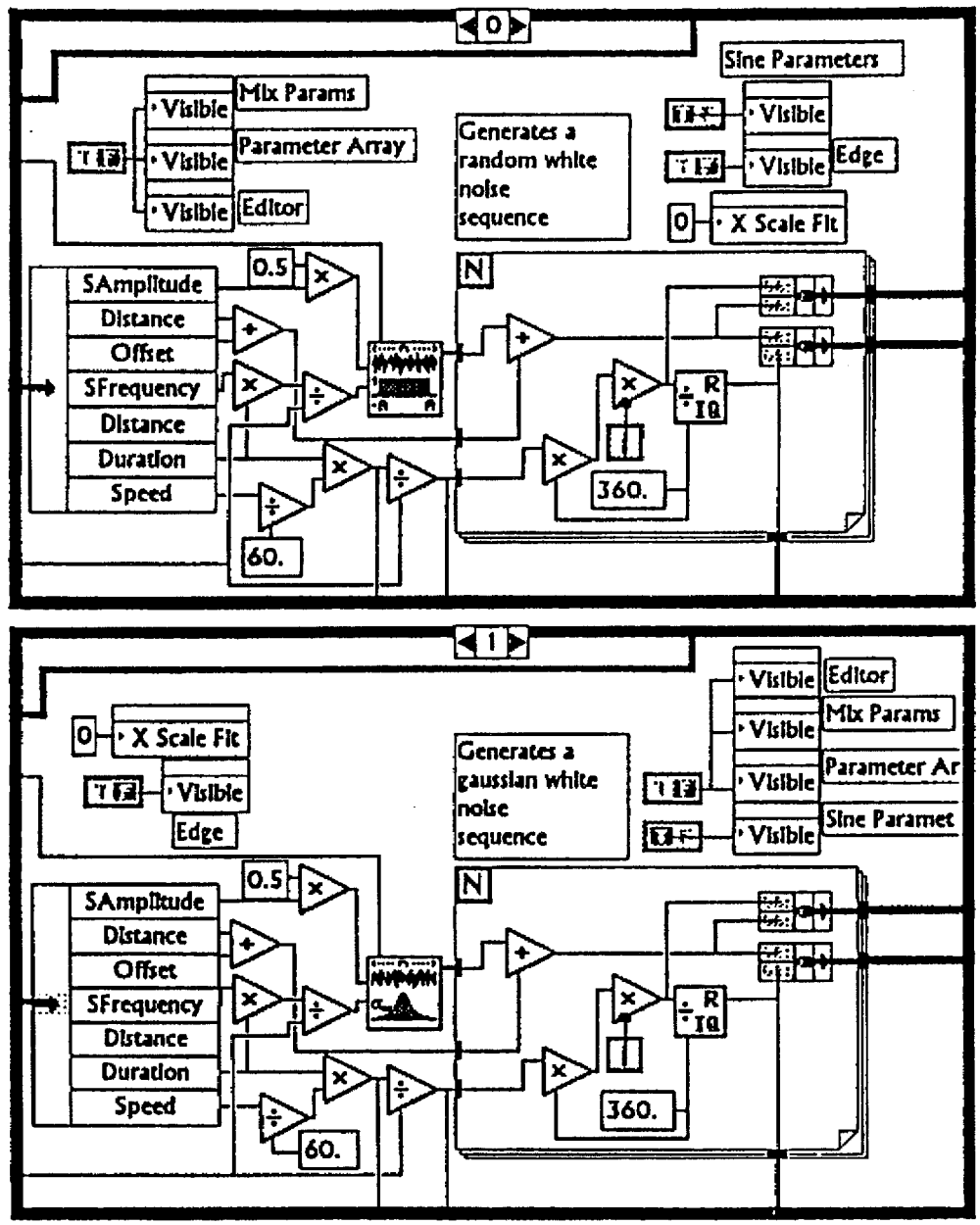
Figure 15:
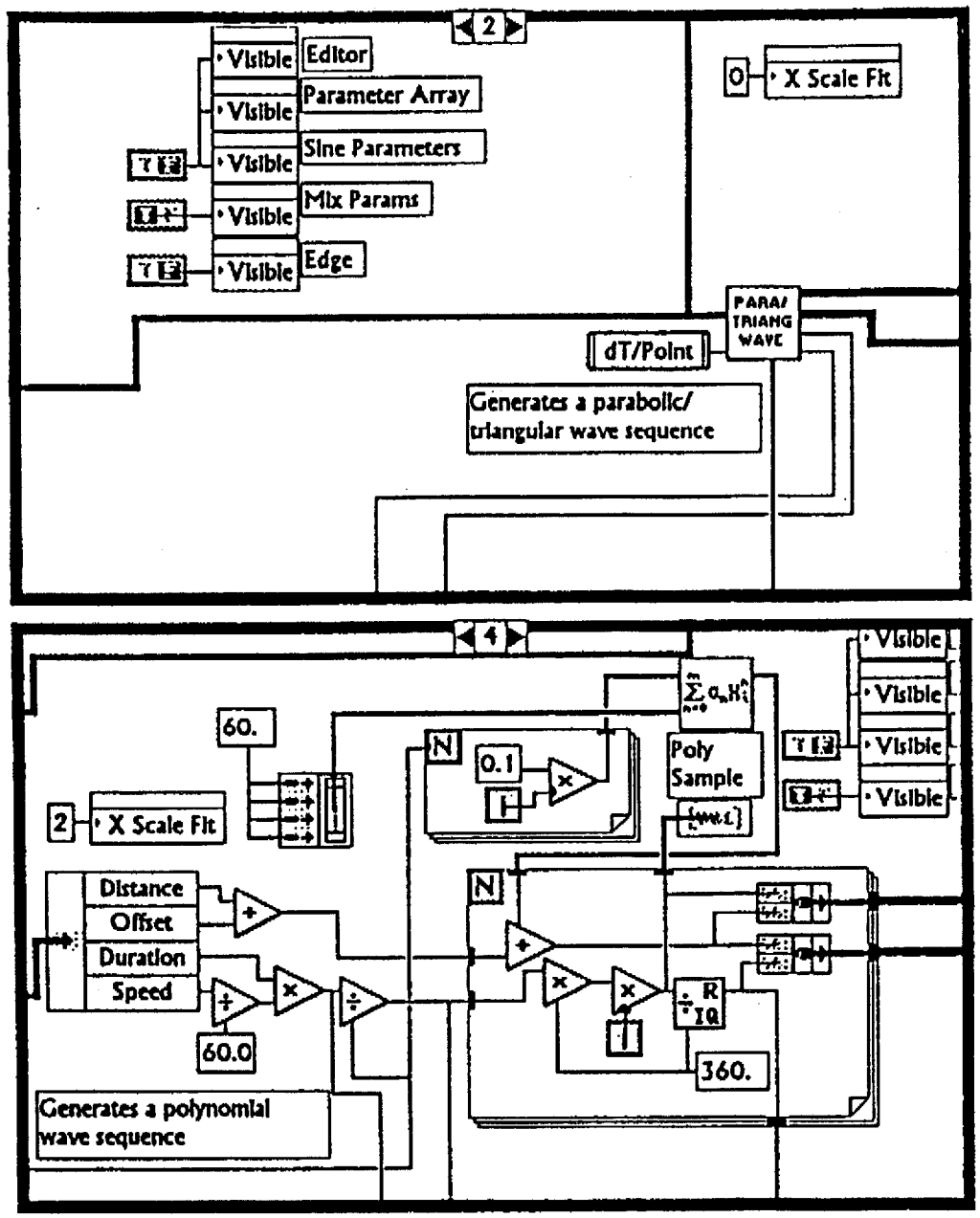
Figure 16:
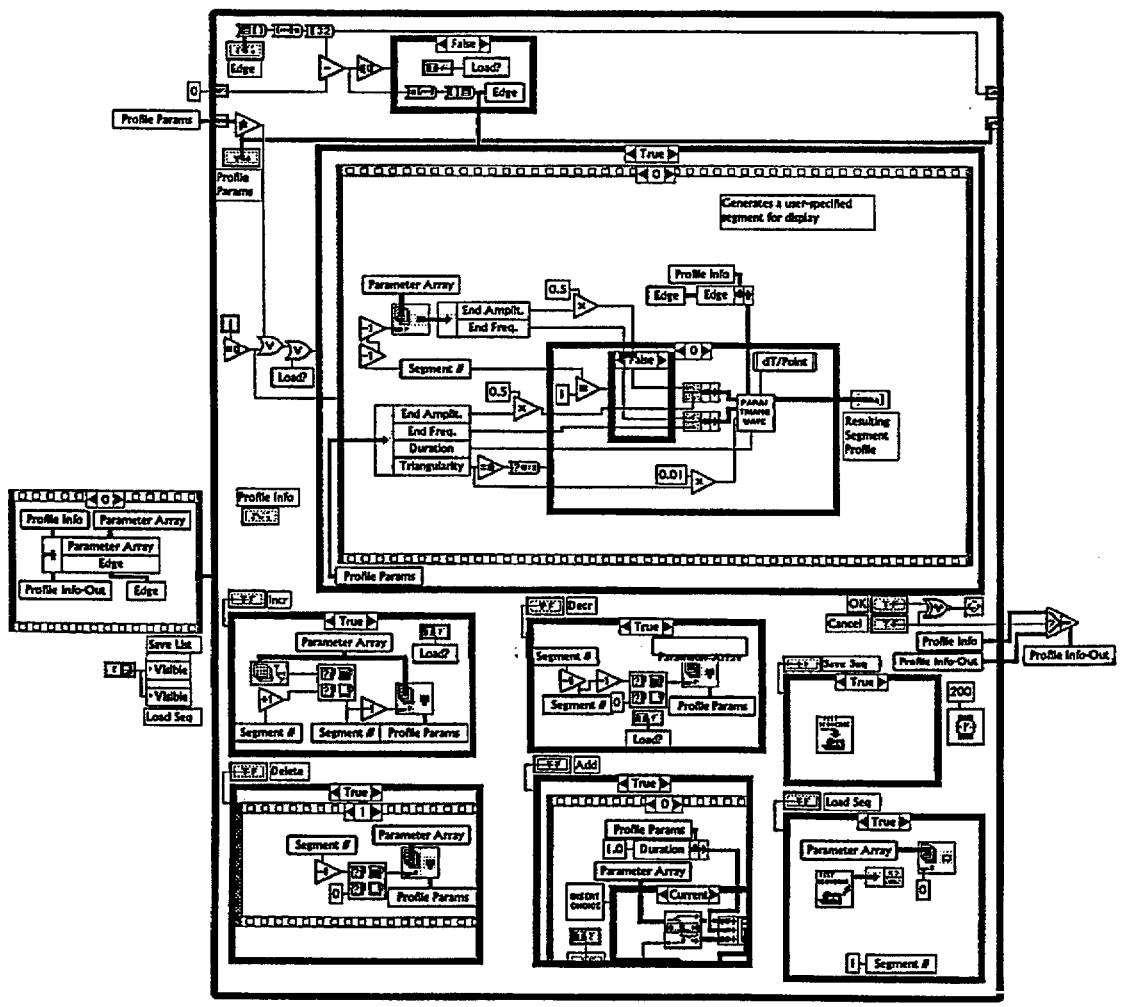
Figure 17:
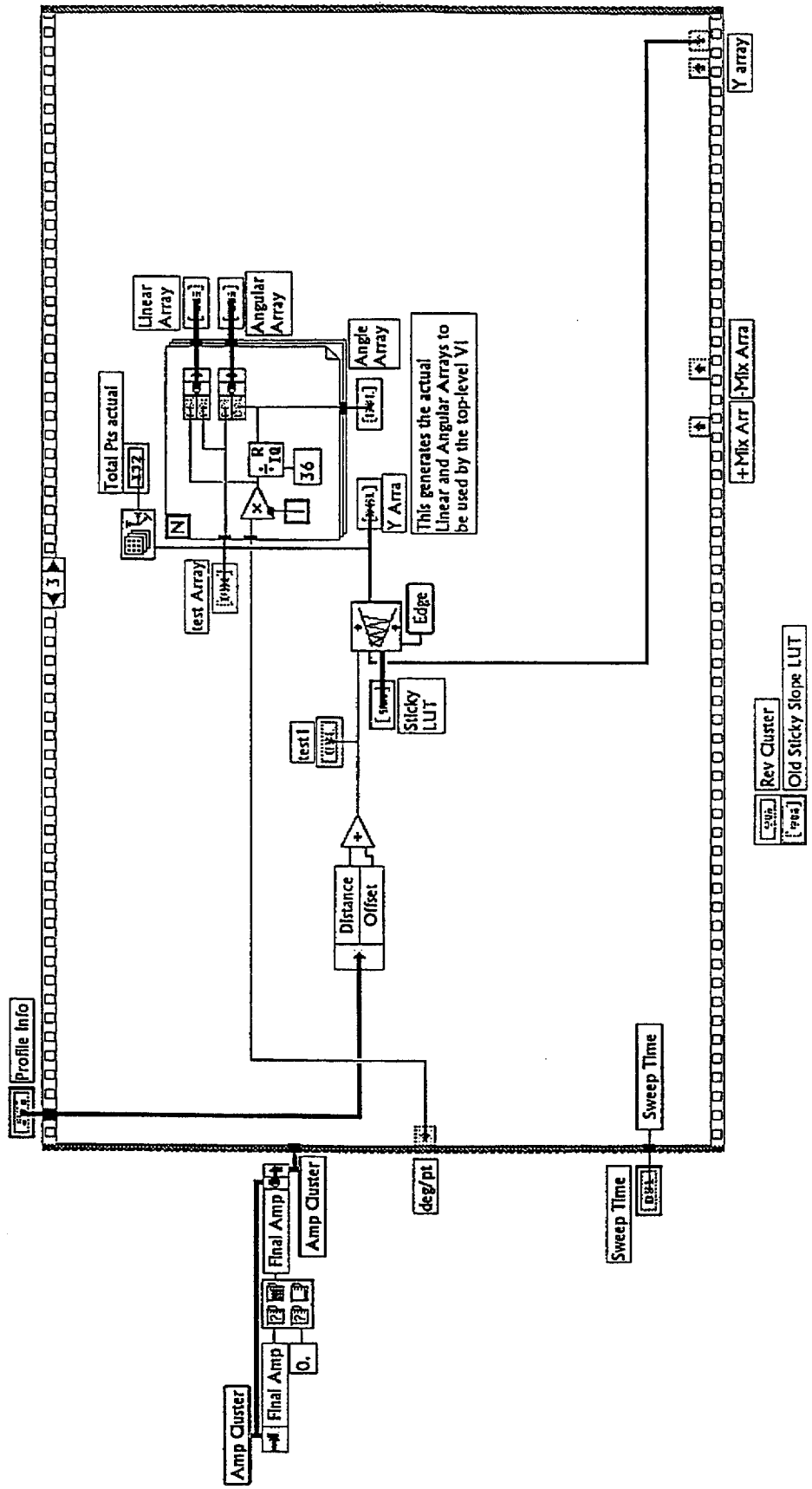
Figure 18:
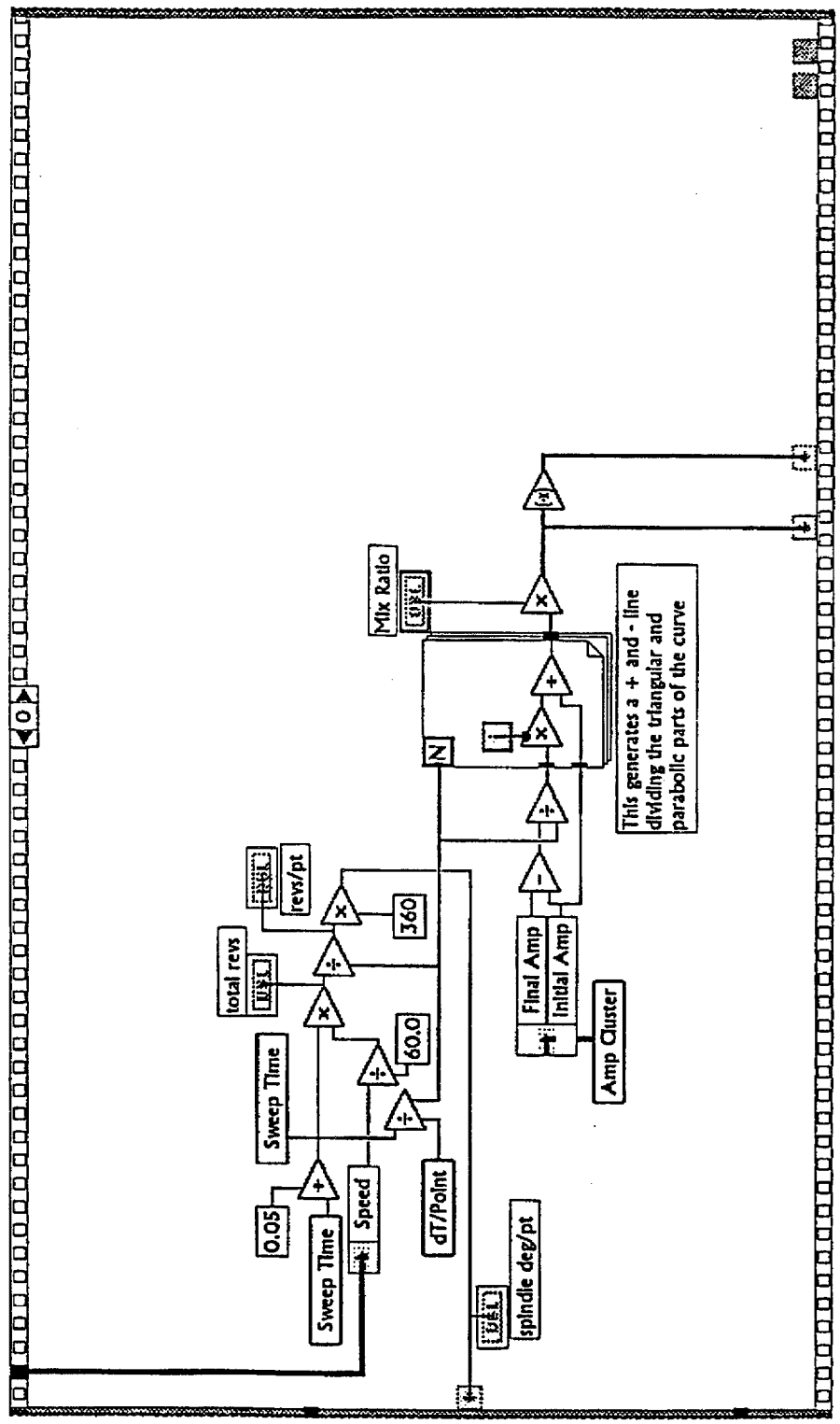
Figure 19:
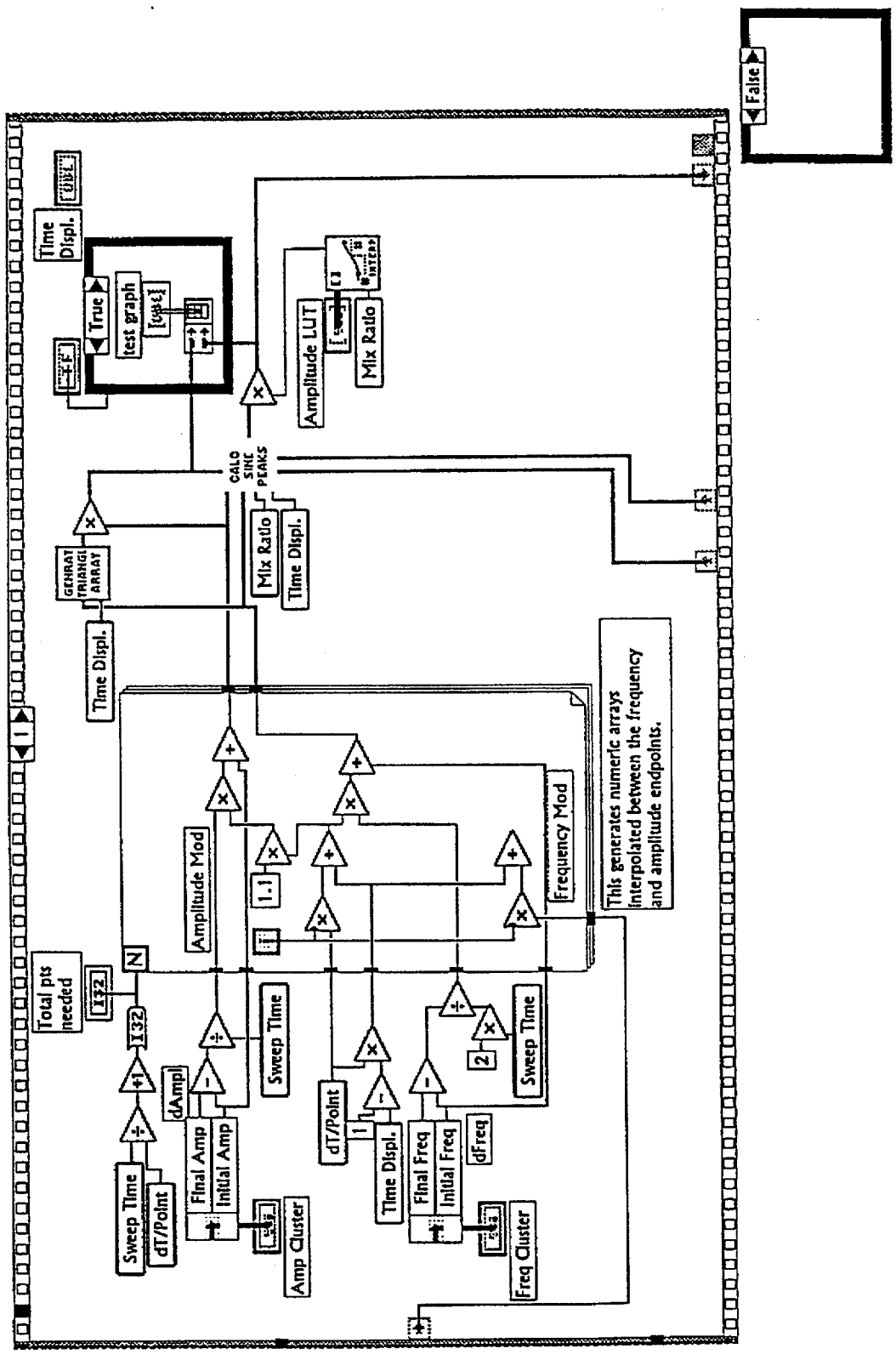
Figure 20:
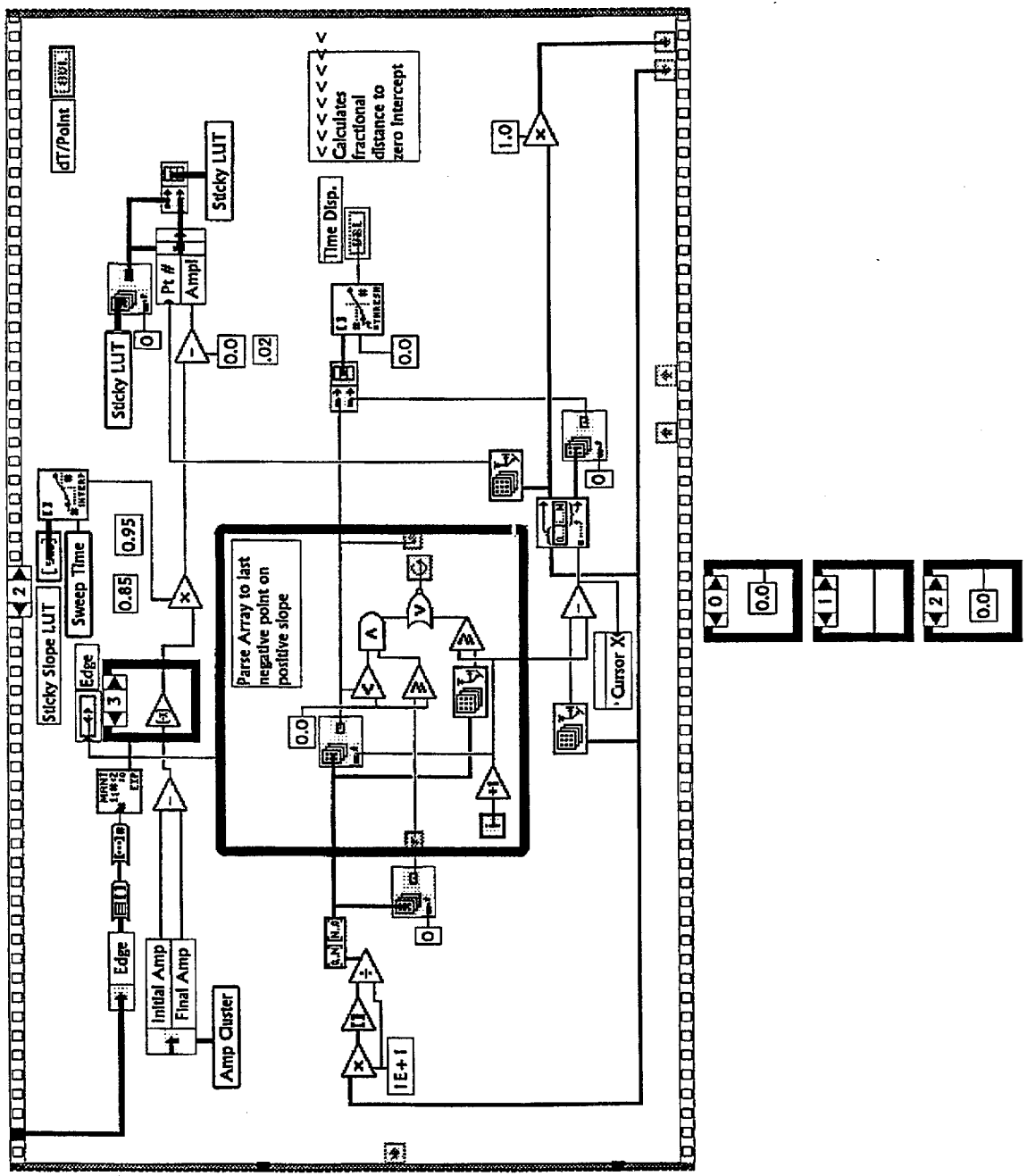

As mentioned, texturizing patterns are made up of at least one segment. In one illustrative example, shown in FIG. 9, a texturizing pattern 348 is comprised of three segments: a ramp-up segment 349, a steady-state segment 350, and a ramp-down segment 351. The ramp-up segment 349 and ramp-down segment 351 are generated because of the acceleration limitations of the physical texturizing apparatus, and may or may not be used to actually texturize the disk. As also mentioned previously, because a perfectly triangular texturizing pattern is generally not used, the tips of the triangular waveform are generally made parabolic. FIG. 10 illustrates one cycle in a segment which contains parabolic tips. Because the tips of a pattern are made parabolic, the segments in a pattern are further comprised of sections, with each section corresponding to a single parabolic or triangular part of a particular segment. Thus, section 353 is the first triangular section in the segment, while section 354 is the first parabolic section in the segment. A single cycle of a parabolic/triangular segment would thus contain five sections.

Figure 8:
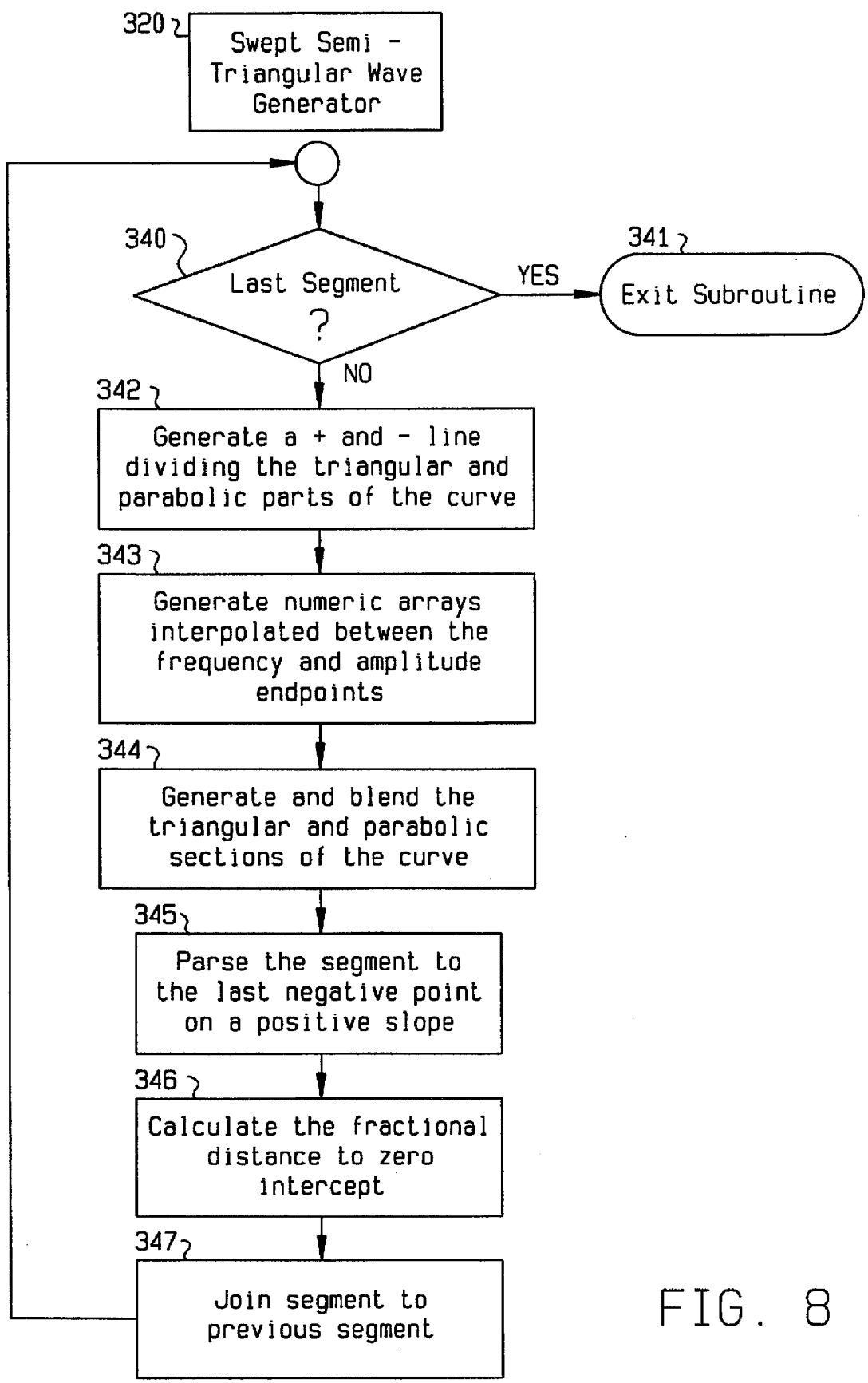
FIG. 8 is a flow chart illustrating a preferred embodiment of a method for generating segments.

FIG. 8 discloses in detail swept semi-triangular wave generator 320. Wave generator 320 allows for the generation of the data points, sections, and segments which are to make up a texturizing pattern. At step 340, wave generator 320 determines, from user input, whether the user would like to generate any further segments. If no further segments are desired, wave generator 320 is exited (step 341). If a segment is to be generated, positive and negative lines dividing the triangular and parabolic sections of the segment must be generated by wave generator 320 (step 342). These lines, labeled as 355 and 356 in FIG. 10, are generated based upon the percentage of pattern triangularity requested by the user. If the user requests a high percentage of triangularity, the parabolic tips of a texturizing pattern will be small. Conversely, if the requested percentage of triangularity is small, then the texturizing pattern will be primarily parabolic. Thus, wave generator 320 uses lines 355 and 356 when generating a segment to determine the point at which the segment is to become parabolic in nature as opposed to triangular. At step 343, numeric arrays are created which include frequency and amplitude data for a segment generated at any given point at every fixed sampling period for the duration of the segment. Because each segment in a pattern is described by its beginning and ending amplitude and frequency (which are inputted by the user), these numeric arrays may be interpolated (and thus generated) by wave generator 320 between these frequency and amplitude endpoints. These arrays serve as look-up tables when the data sequence of a particular segment is generated (step 344). Therefore, when generating sections of a segment, wave generator 320 uses not only the location of lines 355 and 356 which divide the triangular and parabolic portions of a segment, but also uses the numeric arrays. From this process, wave generator 320 generates a sequence of data points, each separated by a fixed sampling period, which when linked together form the generated sections. These data points (which can be viewed using the view data function 367) each have a corresponding phase and amplitude which can be used by data memory and synchronizer 255 to control the angular and linear positions of the disk texturizing apparatus in accordance with the texturizing pattern described by the data points. At step 344, wave generator 320 determines the proper transition between the generated sections and then blends these sections so as to produce a smooth segment waveform. At step 345, the segment, now comprised of smoothly joined sections, is parsed or truncated at a previously determined point (illustratively the zero intercept) so that separate segments may be smoothly joined to create the texturizing pattern. At step 346, it is assured that the segments are smoothly joined by calculating the fractional distance to the zero intercept. With the fractional distance computed, the segment to be added may be moved in relation to the existing pattern so as to form a smooth transition between these segments. Finally, at step 347, the newly created segment is joined to the end of the existing pattern to form a larger pattern.

Although segment editor 384 is the primary tool by which texturizing patterns (and segments of these patterns) are generated, user interface 301 provides the user with a variety of other tools which aid in pattern generation. For example, although the segment parameters which describe each generated segment may be viewed or modified from segment editor 384, this may also be done from user interface 301 (box 380). Box 380 allows the user to view or modify the segment settings for each segment in the pattern being analyzed. The segment settings include the ending amplitude, the ending frequency, the duration, and the triangularity of each segment in a particular pattern. The up and down buttons allow the user to switch between the segments in the pattern. Button 376 allows the user to view the data of a particular pattern. When pushed, button 376 may preferably bring up a window which displays a listing of each point in the data sequence of a texturizing pattern, and the phase and magnitude corresponding to these points. As mentioned, each point in a data sequence is separated by a fixed period and has a corresponding phase and magnitude. Thus, by smoothly linking points in a data sequence together, a texturizing pattern which is described by that data sequence may be generated.

Rather than generating a new pattern, the user also has the option from user interface 301 of utilizing a previously generated standard pattern (372). Illustrative examples of generated patterns that may be provided are random white noise, gaussian white noise, or a constant amplitude and frequency parabolic-triangular mix.

Number of samples (362) displays the number of samples or points in the pattern being viewed. Reference 364 and offset 366 display the distance from spindle centerline to the baseline of the texturizing pattern of a reference particle on the inside diameter (ID) edge of the load roll in two parts. Reference 364 is the fixed part which must match the corresponding dimension on the mechanical texturizing apparatus when the oscillator is at the home position. Offset 366 is the variable part which shifts the defined oscillatory waveform and modifies the oscillator position data in the bit file. Texture duration 368 provides the user with the total length of time of the texturizing pattern being viewed, and spindle speed 370 provides the rotational velocity of the disk and spindle during the texturizing process.

Curve Type 372 displays the type of pattern presently being analyzed. As discussed, this may be a user generated pattern (or a random segment), or it may be a pre-generated texturizing pattern such as random or gaussian white noise or a fixed amplitude and frequency parabolic/triangular mix.

Sticky edge 374 allows the user to force all peaks in a texturizing pattern to one horizontal edge corresponding to the inside diameter (ID) or outside diameter (OD) of a disk. If the pattern peaks are forced to the inside diameter, the pattern will more heavily texturize the disk towards the inside of the disk. This is advantageous as the industry has found it to be ideal if the disk is texturized more heavily towards the center. Moreover, when combining the sticky edge function with the segment editor, a pattern which selectively texturizes zones of the disk with different intensities and crossing angles is possible. Display 382 illustratively shows a texturizing pattern which the sticky edge function has acted upon to force the peaks to the inside diameter. However, the pattern generation system 300 also allows the user to force the pattern peaks to the outside diameter, and hence, texturize the disk more heavily toward the outside edge of the disk.

Pattern generation system 300 also includes a warning function which activates when the texturizing pattern generated by the user exceeds the acceleration and amplitude limitations of the physical texturizing apparatus. Pattern generation system 300 determines whether the physical amplitude limitations of the texturizing apparatus have been exceeded by a direct comparison of input amplitude values to a predetermined maximum amplitude. Pattern generation system 300 determines whether the physical acceleration limitations of the texturizing apparatus have been exceeded by taking the second derivative of the generated texturizing pattern, which is acceleration, and comparing the peak values of the second derivative to some predetermined maximum for a texturizing apparatus, illustratively not more than 2 times the standard acceleration of gravity, and preferably not more than 1.5 times the standard acceleration of gravity. If the peak values for amplitude and acceleration exceed the predetermined maximum, box 420 appears in the graphical interface and the user is not allowed to export the data sequence of that pattern.

Once a texturizing pattern has been generated using the above utilities, the user has one of two options. The user can either save the pattern 386 or export the pattern 378 to the data memory and synchronizer 255. If the user would like to save the pattern for later use or modification, the data sequence which comprises the texturizing pattern may be saved in a compressed binary format so that the sequence can be rapidly reloaded. If the user would like to export the pattern to data memory and synchronizer 255, the data sequence of the pattern may be exported in the form of a bit file which contains the phase and amplitude information of each point in the data sequence. Finally, button 392 allows the user to exit the user interface.

As previously noted, it is undesirable for a texturizing pattern to repeat or retrace the same path on successive rotations of the disk. An algorithm developed by the inventors for analytically determining frequencies which will not produce repeating patterns, referred to herein as a frequency factors algorithm, will now be described. The principle of the frequency factors algorithm is to avoid any combination of oscillation frequency and rotation frequency where either frequency contains a common integer multiple of the inverse of the total texture processing time.

For a total texturization time T which is the time during which the abrasive media is in contact with the disk, a fundamental frequency f may be chosen such that f is less than 1/T. According to the frequency factors algorithm, if an oscillation frequency F1 and a rotation frequency F2 are chosen such that F1=n1 * f, and F2=n2 * f, where n1 and n2 are integers having no common factors other than unity, then the resulting texturizing pattern will be non-repeating during the processing time T.

Preferably, the frequency factors algorithm is incorporated in the pattern generation system 300 such that when a given texturizing pattern is generated by the user, the pattern is automatically checked using the frequency factors algorithm and a warning is generated if the pattern will be repeating. Alternatively, the frequency factors algorithm may be invoked by the user in order to check for repeating patterns. Thus, according to the invention, non-repeating texturizing patterns are easily generated by the user.

Various embodiments of the invention have been described. The descriptions are intended to be illustrative of the present invention. It will be apparent to those skilled in the art that modifications may be made to the invention as described without departing from the scope of the claims set out below. For example, it is to be understood that although the invention is described using as an example a texturizing pattern formed by a single abrasive particle as it contacts a rotating disk, any texturizing pattern that illustrates the relative motion between the disk to be texturized and the texturizing media is contemplated to fall within the scope of this invention. It is to be further understood that although the invention is described using as an example a texturizing medium such as abrasive tape, any method or apparatus for texturizing the surface of a disk is contemplated to fall within the scope of the invention.

We claim:

1. For use in connection with a disk texturizing apparatus, a method for creating a disk texturizing pattern comprising:

determining at least one parameter which is to be used for generating said disk texturizing pattern, said disk texturizing pattern defining rotational positions of a disk to be texturized and defining linear positions of a disk with respect to a texturizing medium to be brought into contact with the disk;

generating said disk texturizing pattern from said at least one parameter;

graphically displaying said disk texturizing pattern; and verifying whether said disk texturizing pattern is in accordance with said at least one parameter;

whereby said disk texturizing apparatus is controllable to texturize disks according to the rotational and linear positions defined by said disk texturizing pattern.

2. The method of claim 1 wherein said step of verifying is accomplished by viewing said display.

3. The method of claim 1 wherein said at least one parameter comprises a predetermined level of pattern overlap.

4. The method of claim 3 wherein said disk texturizing pattern is generated in accordance with said predetermined level of pattern overlap through the use of a frequency factors algorithm.

5. The method of claim 1 wherein said at least one parameter comprises a predetermined percentage of triangularity in at least a portion of said disk texturizing pattern.

6. The method of claim 1 wherein said at least one parameter comprises a predetermined level of acceleration of a portion of said disk texturizing apparatus.

7. The method of claim 1 wherein said at least one parameter comprises a predetermined level of amplitude in at least a portion of said disk texturizing pattern.

8. The method of claim 1 wherein said step of displaying comprises generating and displaying a polar plot of said disk texturizing pattern.

9. The method of claim 1 wherein said step of displaying comprises generating and displaying a linear plot of said disk texturizing pattern.

10. The method of claim 1 wherein said step of displaying comprises generating and displaying at least a portion of said disk texturizing pattern using a sticky edge function.

11. An apparatus for texturizing a disk, comprising:

a base member;

a rotatable spindle adapted to hold a disk for rotation, said spindle mounted on the base member for translational movement with respect to the base member;

an oscillating mechanism cooperating synchronously with the spindle to impart translational oscillation to the spindle with respect to the base member;

a controller communicating with said oscillating mechanism adapted and configured to control at least the translational movement of said spindle in accordance with a predetermined disk texturizing pattern; and a texturizing assembly mounted on the base member and configured and dimensioned to position a texturizing medium in contact with a disk held and rotated by the spindle.

12. The apparatus according to claim 11, further comprising:

means for monitoring the speed of translational oscillation and translational position of the spindle, said controller communicating with said translation monitoring means, and controlling the oscillating mechanism in response to the monitored translational speed and position.

13. The apparatus according to claim 11, further comprising:

a motor cooperating with the spindle to rotate the spindle;

means for monitoring the speed of rotation and angular position of the spindle, said controller communicating with said rotation monitoring means, and controlling the motor in response to the monitored rotational speed and position.

14. The apparatus according to claim 13, wherein said controller controls the motor in accordance with said disk texturizing pattern.

15. The apparatus according to claim 11, further comprising:

means for monitoring the speed of translational oscillation and translational position of the spindle;

a motor cooperating with the spindle to rotate the spindle;

means for monitoring the speed of rotation and angular position of the spindle, said controller communicating with said rotation monitoring means and said translation monitoring means, said controller controlling the motor and oscillating mechanism in response to the monitored rotational and translational speeds and positions and in accordance with said disk texturizing pattern.

16. The apparatus according to claim 15, wherein said controller controls the motor and oscillating mechanism in accordance with said disk texturizing pattern, and wherein said predetermined texturizing pattern is non-repeating.

17. The apparatus according to claim 15, wherein said controller modulates the rotational speed of the spindle in accordance with said disk texturizing pattern.

18. The apparatus according to claim 17, wherein said controller reduces the rotational speed of the spindle when the translational velocity of the spindle reverses directions.

19. The apparatus according to claim 15, further comprising:

a user-interactive processor for generating said disk texturizing pattern; and display means for displaying the user generated texturizing pattern;

wherein the controller controls the motor and oscillating mechanism in accordance with said user generated texturizing pattern.

20. The apparatus of claim 15:

wherein said texturizing medium is narrow relative to the width of a zone of the disk to be texturized; and wherein said controller controls the motor and oscillating mechanism in accordance with said predetermined texturizing pattern for said zone of the disk.

21. The apparatus of claim 11 further comprising a computer memory in communication with said controller, wherein said disk texturizing pattern is stored on said computer memory, and said disk texturizing pattern defines rotational positions of the disk and translational positions of the spindle with respect to the base member.

22. The apparatus of claim 21 wherein said disk texturizing pattern comprises a plurality of datapoints, each datapoint defining a rotational position and a corresponding translational position.

23. An apparatus for texturizing a disk, comprising:

a base member;

a rotatable spindle adapted to hold a disk for rotation, mounted on the base member;

a motor cooperating with the spindle to rotate the spindle;

a texturizing assembly mounted on the base member and configured and dimensioned to position a texturizing medium in contact with a disk held on and rotated by the spindle;

an oscillating mechanism to impart relative translational oscillation between the spindle and the texturizing medium;

means for monitoring the translational relative position between the spindle and the texturizing medium;

means for monitoring the speed of rotation and angular position of the spindle;

a controller communicating with said rotation monitoring means and said translation monitoring means, said controller controlling the motor and oscillating mechanism in response to the monitored translational positions and the rotational speeds and positions.

24. An apparatus for texturizing a disk, comprising:

a base member;

a rotatable spindle adapted to hold a disk for rotation, said spindle mounted on the base member for translational movement with respect to the base member;

a motor cooperating with the spindle to rotate the spindle;

means for monitoring the speed of rotation and angular position of the spindle;

an oscillating mechanism cooperating synchronously with the spindle to impart translational oscillation to the spindle with respect to the base member;

means for monitoring the translational speed of oscillation and translational position of the spindle;

a texturizing assembly mounted on the base member and configured and dimensioned to position a texturizing medium in contact with a disk held on and rotated by the spindle;

a user-interactive processor for generating a texturizing pattern; and a controller communicating with said rotation monitoring means and said translation monitoring means, said controller controlling the motor and oscillating mechanism in response to the monitored rotational and translational speeds and positions in accordance with the user generated texturizing pattern.

25. A method of visually displaying, on a display area, items of information stored in a computer memory representing a disk texturizing pattern, comprising:

storing a disk texturizing pattern in said computer memory, said disk texturizing pattern defining rotational positions of a disk to be texturized and defining linear positions of the disk with respect to a texturizing medium to be brought into contact with the disk;

graphically displaying at least a portion of said disk texturizing pattern in said display area;

modifying said disk texturizing pattern in accordance with user commands; and storing said modified disk texturizing pattern in said computer memory.

26. The method of claim 25 wherein said step of graphically displaying comprises generating and displaying a polar plot of said disk texturizing pattern.

27. The method of claim 25 wherein said step of graphically displaying comprises generating and displaying a linear plot of said disk texturizing pattern.

28. The method of claim 25 wherein said step of graphically displaying comprises generating and displaying at least a portion of said disk texturizing pattern using a sticky edge function.

29. The method of claim 25, further comprising:
identifying at least one physical limitation of an associated disk texturizing apparatus to be used to texturize disks;
storing said at least one physical limitation in computer memory; and
generating a warning signal if said texturizing pattern is incompatible with said at least one physical limitation of said disk texturizing apparatus.

30. The method of claim 29 wherein said at least one physical limitation comprises an apparatus acceleration not more than 2 times the standard acceleration of gravity.

31. The method of claim 25 wherein said disk texturizing pattern comprises a plurality of datapoints, each datapoint defining a rotational position and a corresponding linear position.

32. The method of claim 31 wherein the step of texturizing comprises the steps of:
rotating the disk according to the rotational positions defined by said modified disk texturizing pattern; and
oscillating the disk with respect to the texturizing medium in accordance with the linear positions defined by said modified disk texturizing pattern.

33. The method of claim 25 further comprising the step of texturizing a disk in accordance with the rotational and linear positions defined by said modified disk texturizing pattern using a disk texturizing apparatus which is in electronic communication with said computer memory.

34. An apparatus for visually displaying items of information regarding the generation of disk texturizing patterns, comprising:
a computer programmed to generate a disk texturizing pattern, said disk texturizing pattern defining rotational positions of a disk to be texturized and defining relative linear positions of the disk with respect to a texturizing medium to be brought into contact with the disk;
a computer memory in communication with said computer adapted to store said disk texturizing pattern and to store at least one predetermined parameter which is to be used for generating said disk texturizing pattern, wherein said computer permits user modification of said disk texturizing pattern if said pattern is not in accordance with the at least one predetermined parameter; and
a display in communication with said computer for graphically displaying at least a portion of said disk texturizing pattern.

35. The apparatus of claim 34 wherein said display for graphically displaying at least a portion of a texturizing pattern comprises a polar plot of at least a portion of said disk texturizing pattern.

36. The apparatus of claim 34 wherein said display for graphically displaying at least a portion of a texturizing pattern comprises a linear plot of at least a portion of said disk texturizing pattern.

37. The apparatus of claim 34 wherein at least a portion of said texturizing pattern is displayed using a sticky edge function.

38. The apparatus of claim 34 wherein said computer further generates a warning signal if said texturizing pattern is incompatible with the physical limitations of an associated disk texturizing apparatus for texturizing disks according to said texturizing pattern.

39. The apparatus of claim 34 wherein said disk texturizing pattern comprises a plurality of datapoints, each datapoint defining a rotational position and a corresponding linear position.

40. The apparatus of claim 34 further comprising:
a base member;
a rotatable spindle adapted to hold the disk for rotation, said spindle mounted on the base member for translational movement with respect to the base member;
an oscillating mechanism cooperating synchronously with the spindle to impart translational oscillation to the spindle with respect to the base member;
a controller communicating with said computer memory, said oscillating mechanism, and said spindle adapted, the controller configured to control the translational movement and rotation of said spindle in accordance with the rotational positions and linear positions defined by said disk texturizing pattern; and
a texturizing assembly mounted on the base member and configured and dimensioned to position a texturizing medium in contact with a disk held on and rotated by the spindle.

41. For use in connection with a disk texturizing apparatus, a method for generating a disk texturizing pattern comprising the steps of:
determining at least one parameter which is to be used for generating said disk texturizing pattern;
generating parabolic and triangular sections of said disk texturizing pattern in accordance with said at least one parameter;
blending said sections to form said disk texturizing pattern; and
storing said disk texturizing pattern in a computer memory;
whereby said disk texturizing apparatus is controllable to texturize disks according to said disk texturizing pattern.

42. The method of claim 41 wherein said at least one parameter comprises a predetermined level of pattern overlap.

43. The method of claim 41 wherein said disk texturizing pattern is generated in accordance with said predetermined level of pattern overlap through the use of a frequency factors algorithm.

44. The method of claim 41 wherein said at least one parameter comprises a predetermined percentage of triangularity in at least a portion of said disk texturizing pattern.

45. The method of claim 41 wherein said at least one parameter comprises a predetermined level of acceleration in a portion of said disk texturizing apparatus.

46. The method of claim 41 wherein said at least one parameter comprises a predetermined level of amplitude in at least a portion of said disk texturizing pattern.

47. The method of claim 41 further comprising:
displaying said disk texturizing pattern; and
verifying that said disk texturizing pattern is in accordance with said at least one parameter from said display.

48. The method of claim 47 wherein said step of displaying comprises generating and displaying a polar plot of said disk texturizing pattern.

49. The method of claim 47 wherein said step of displaying comprises generating and displaying a linear plot of said disk texturizing pattern.

50. The method of claim 47 wherein said step of displaying comprises generating and displaying at least a portion of said disk texturizing pattern using a sticky edge function.

51. An apparatus for visually displaying, on a display area, items of information stored in computer memory relating to the generation of disk texturizing patterns, comprising means for practicing the following steps:

generating a disk texturizing pattern on a computer programmed to generate said disk texturizing pattern, said disk texturizing pattern defining rotational positions of a disk to be texturized and defining relative linear positions of the disk with respect to a texturizing medium to be brought into contact with the disk;

storing said disk texturizing pattern in said computer memory;

displaying at least a portion of said disk texturizing pattern in said display area; and modifying said disk texturizing pattern in accordance with user commands.

52. The apparatus of claim 51, further comprising means for practicing the following steps:

identifying at least one physical limitation of an associated disk texturizing apparatus to be used to texturize disks;

storing said at least one physical limitation in computer memory; and generating a warning signal if said texturizing pattern is incompatible with said at least one physical limitation of said disk texturizing apparatus.

53. The apparatus of claim 52 wherein said at least one physical limitation comprises a limitation on the acceleration of an oscillating portion of the apparatus to not more than 2 times the standard acceleration of gravity.

54. For use in connection with a disk texturizing apparatus, an apparatus for creating a disk texturizing pattern comprising means for practicing the following steps:

determining at least one parameter of said disk texturizing pattern;

generating said disk texturizing pattern from said at least one parameter;

displaying said disk texturizing pattern; and verifying that said disk texturizing pattern is in accordance with said at least one parameter;

whereby said disk texturizing apparatus is controllable to texturize disks according to said disk texturizing pattern.

55. The apparatus of claim 54 wherein said means for practicing the step of verifying includes means for viewing said means for displaying, and said at least one parameter comprises a predetermined level of pattern overlap.

56. The apparatus of claim 55 further comprising means for generating said disk texturizing pattern in accordance with said predetermined level of pattern overlap through the use of a frequency factors algorithm.

57. For use in connection with a disk texturizing apparatus, an apparatus for generating a disk texturizing pattern comprising:

means for determining at least one parameter of said disk texturizing pattern;

means for generating parabolic and triangular sections of said disk texturizing pattern in accordance with said at least one parameter;

means for blending said sections to form said disk texturizing pattern; and means for storing said disk texturizing pattern in a computer memory;

whereby said disk texturizing apparatus is controllable to texturize disks according to said disk texturizing pattern.

58. The apparatus of claim 57 wherein said means for displaying comprises means for generating and displaying a polar plot and a linear plot of said disk texturizing pattern.

59. The apparatus of claim 57 wherein said means for displaying comprises means for generating and displaying at least a portion of said disk texturizing pattern using a sticky edge function.

60. An apparatus for texturizing a disk, comprising:

a base member;

a rotatable spindle adapted to hold a disk for rotation, said spindle mounted on the base member for translational movement with respect to the base member;

an oscillating mechanism cooperating synchronously with the spindle to impart translational oscillation to the spindle with respect to the base member;

a texturizing assembly mounted on the base member and configured and dimensioned to position a texturizing medium in contact with a disk held on and rotated by the spindle;

means for monitoring the speed of translational oscillation and translational position of the spindle; and a controller communicating with said translation monitoring means, said controller controlling the oscillating mechanism in response to the monitored translational speed and position.

61. The apparatus according to claim 60, wherein said controller controls the oscillating mechanism in accordance with a predetermined texturizing pattern.

62. An apparatus for texturizing a disk, comprising:

a base member;

a rotatable spindle adapted to hold a disk for rotation, said spindle mounted on the base member for translational movement with respect to the base member;

an oscillating mechanism cooperating synchronously with the spindle to impart translational oscillation to the spindle with respect to the base member;

a texturizing assembly mounted on the base member and configured and dimensioned to position a texturizing medium in contact with a disk held on and rotated by the spindle;

a motor cooperating with the spindle to rotate the spindle;

means for monitoring the speed of rotation and angular position of the spindle; and a controller communicating with said rotation monitoring means, said controller controlling the motor in response to the monitored rotational speed and position.

63. The apparatus according to claim 62, wherein said controller controls the motor in accordance with a predetermined texturizing pattern.

64. An apparatus for texturizing a disk, comprising:

a base member;

a rotatable spindle adapted to hold a disk for rotation, said spindle mounted on the base member for translational movement with respect to the base member;

an oscillating mechanism cooperating synchronously with the spindle to impart translational oscillation to the spindle with respect to the base member;

a texturizing assembly mounted on the base member and configured and dimensioned to position a texturizing medium in contact with a disk held on and rotated by the spindle;

means for monitoring the speed of translational oscillation and translational position of the spindle;

a motor cooperating with the spindle to rotate the spindle;

means for monitoring the speed of rotation and angular position of the spindle; and a controller communicating with said rotation monitoring means and said translation monitoring means, said controller controlling the motor and oscillating mechanism in response to the monitored rotational and translational speeds and positions.

65. The apparatus according to claim 64, wherein said controller controls the motor and oscillating mechanism in accordance with a predetermined, non-repeating texturizing pattern.

66. The apparatus according to claim 64, wherein said controller modulates the rotational speed of the spindle in accordance with a predetermined texturizing pattern.

67. The apparatus according to claim 66, wherein said controller reduces the rotational speed of the spindle when the translational velocity of the spindle reverses directions.

68. The apparatus according to claim 64, further comprising:

a user-interactive processor for generating a texturizing pattern; and display means for displaying the user generated texturizing pattern;

wherein the controller controls the motor and oscillating mechanism in accordance with said user generated texturizing pattern.

69. The apparatus of claim 64:

wherein said texturizing medium is narrow relative to the width of a zone of the disk to be texturized; and wherein said controller controls the motor and oscillating mechanism in accordance with a predetermined texturizing pattern for said zone of the disk.

70. A method of visually displaying, on a display area, items of information stored in computer memory relating to the generation of disk texturizing patterns, comprising:

storing a disk texturizing pattern in said computer memory;

displaying at least a portion of said disk texturizing pattern in said display area;

modifying said disk texturizing pattern in accordance with user commands;

identifying at least one physical limitation of an associated disk texturizing apparatus to be used to texturize disks;

storing said at least one physical limitation in computer memory; and generating a warning signal if said texturizing pattern is incompatible with said at least one physical limitation of said disk texturizing apparatus.

71. The method of claim 70 wherein said at least one physical limitation comprises an apparatus acceleration not more than 2 times the standard acceleration of gravity.

* * * * *